March 14, 1944.  N. P. LLOYD  2,343,914
AUTOMATIC LATHE
Filed March 15, 1941  16 Sheets-Sheet 13
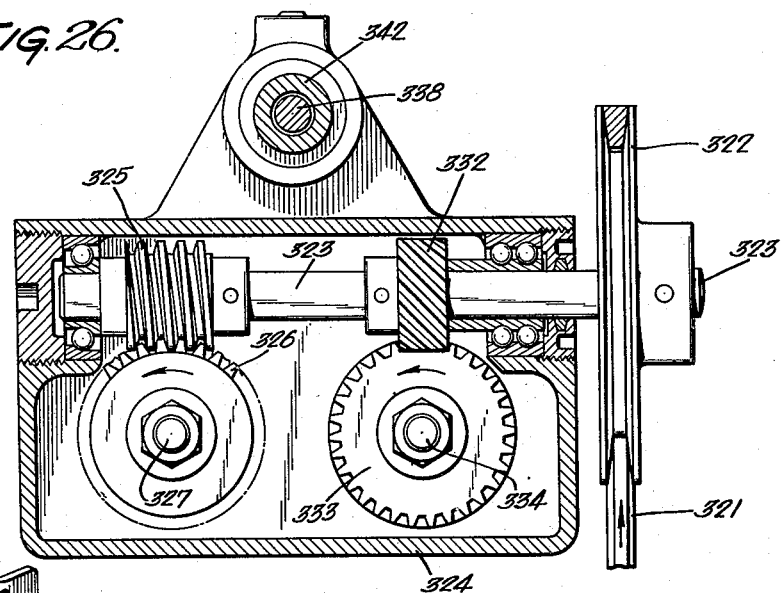
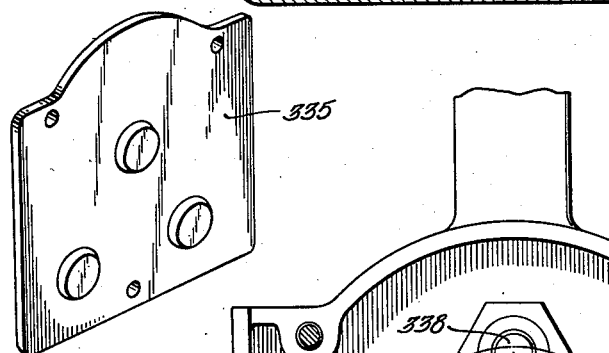
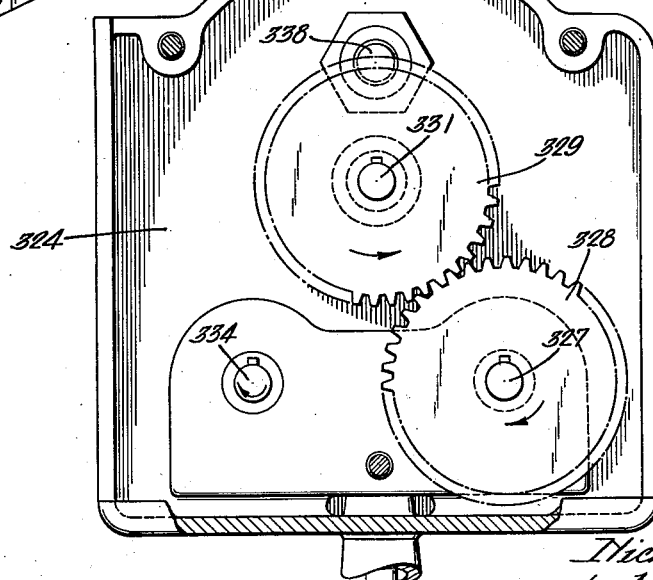
Inventor:
Nicholas P. Lloyd
by his Attorneys
Howson & Howson

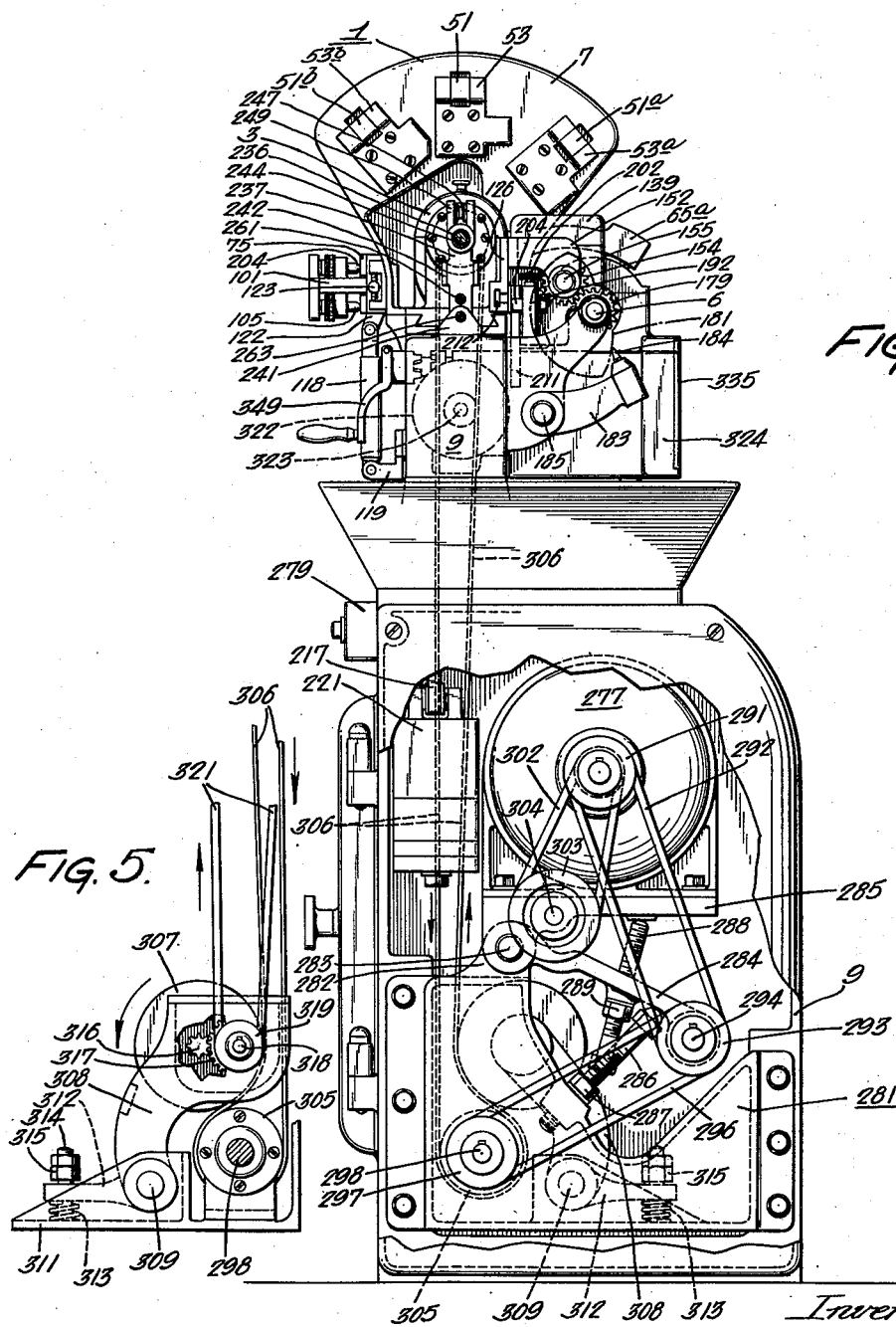

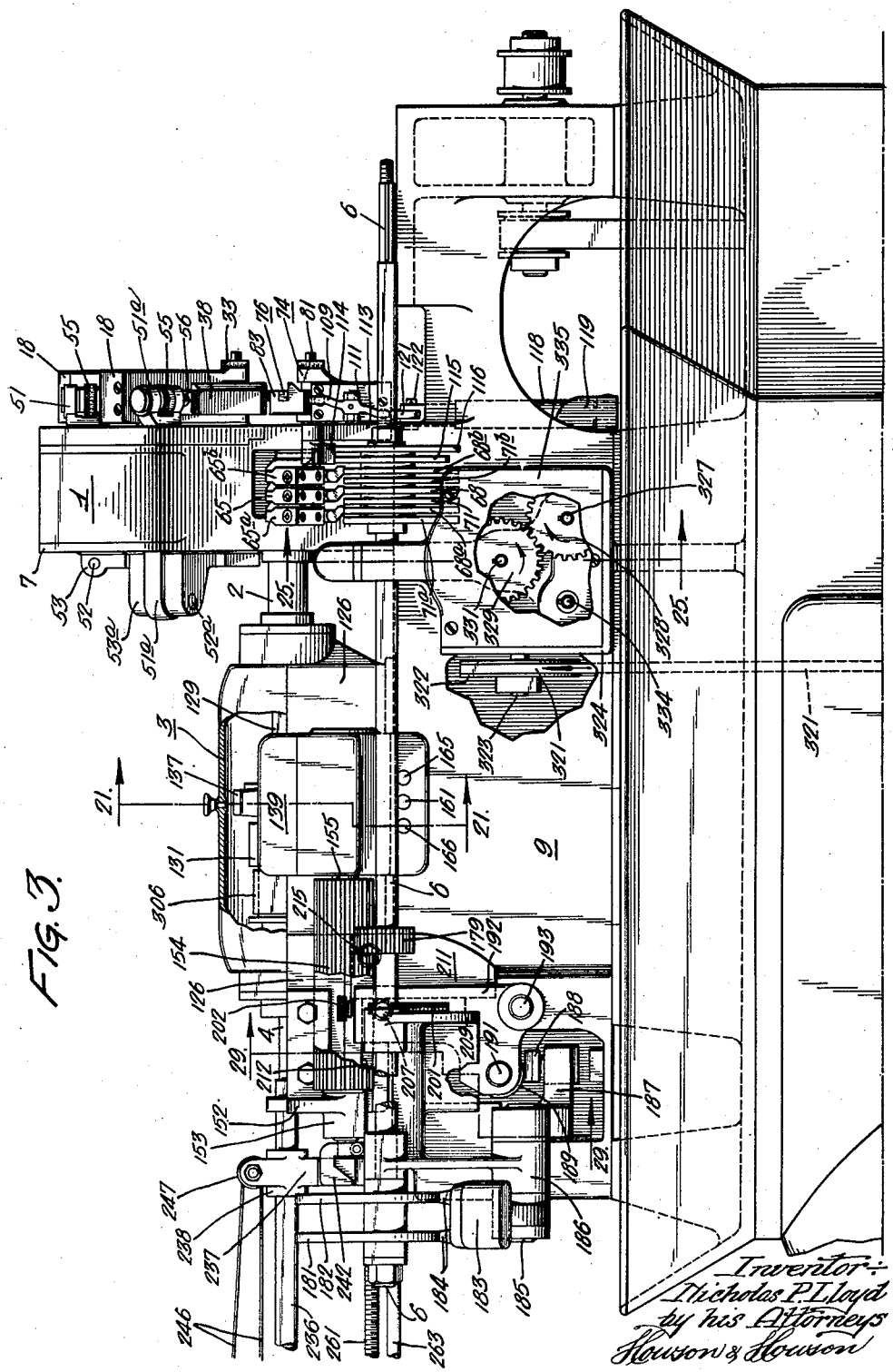

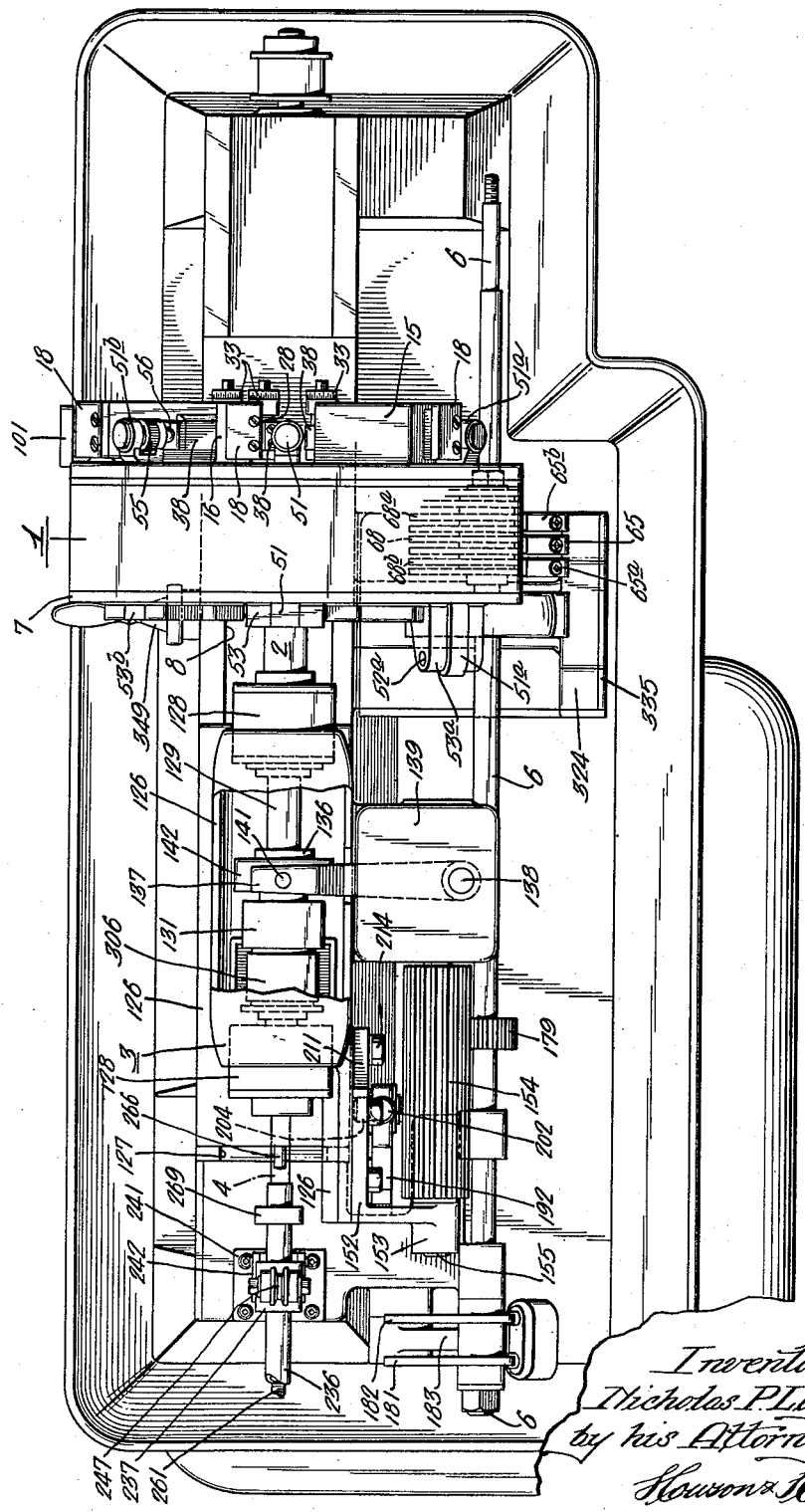

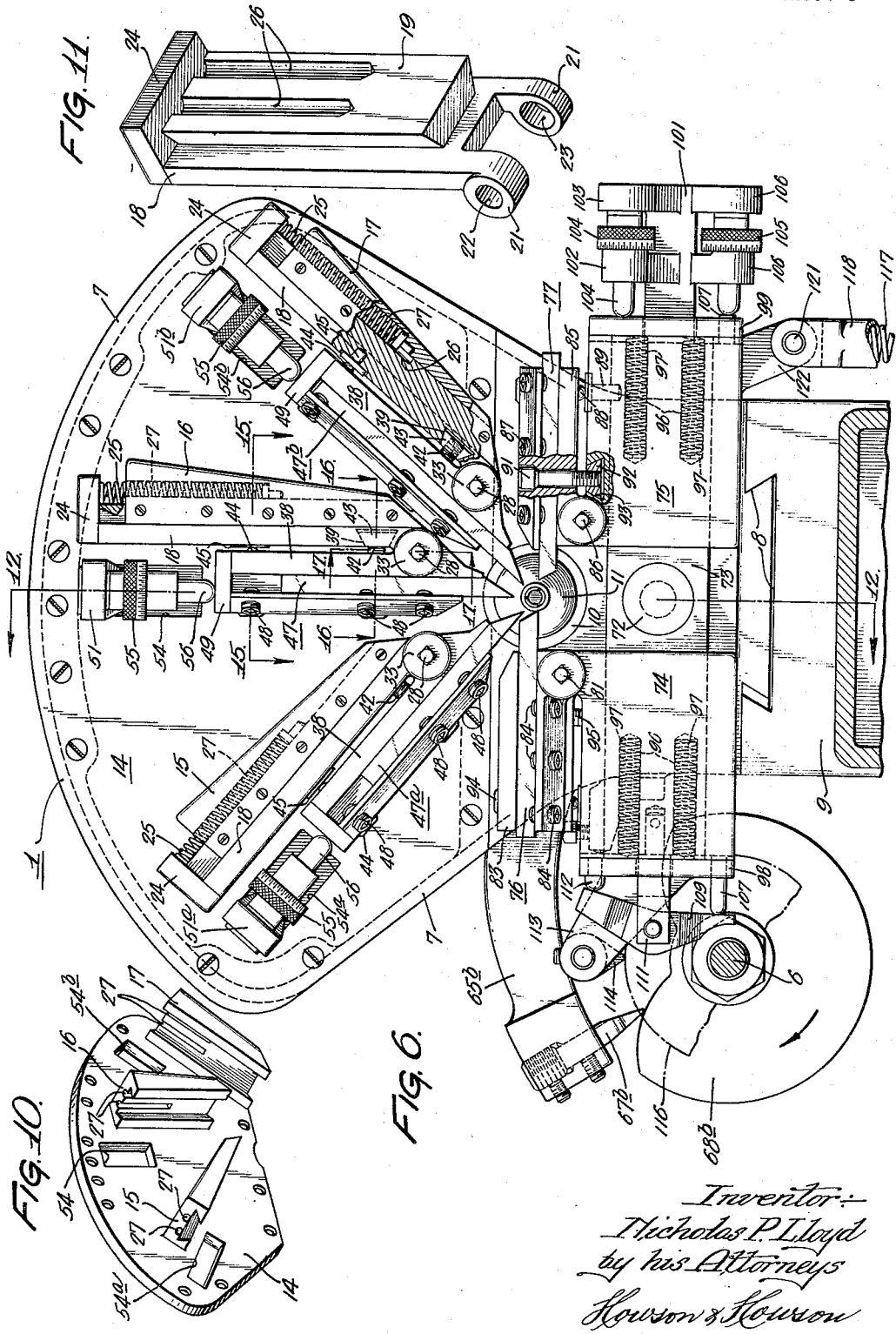

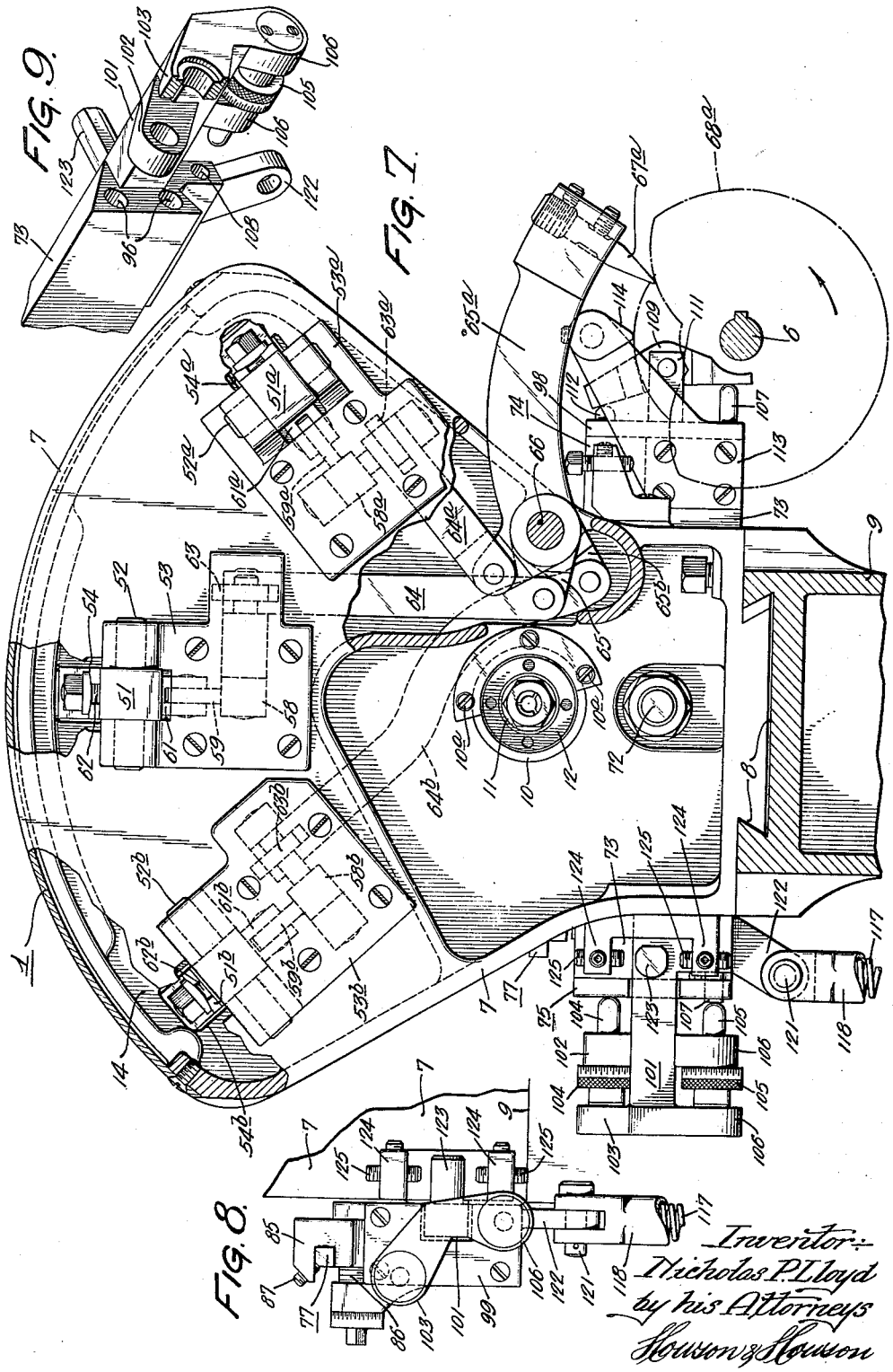

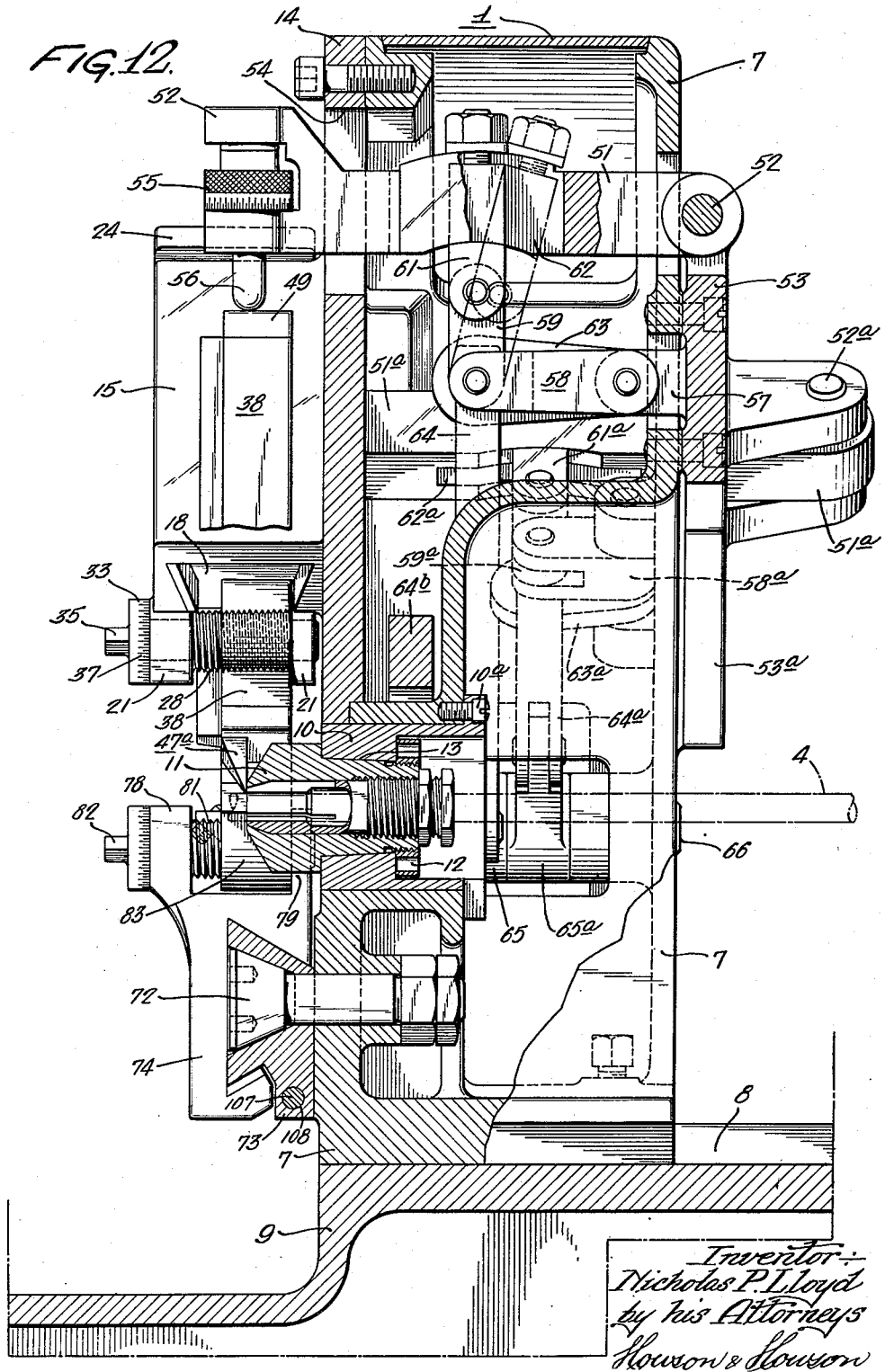

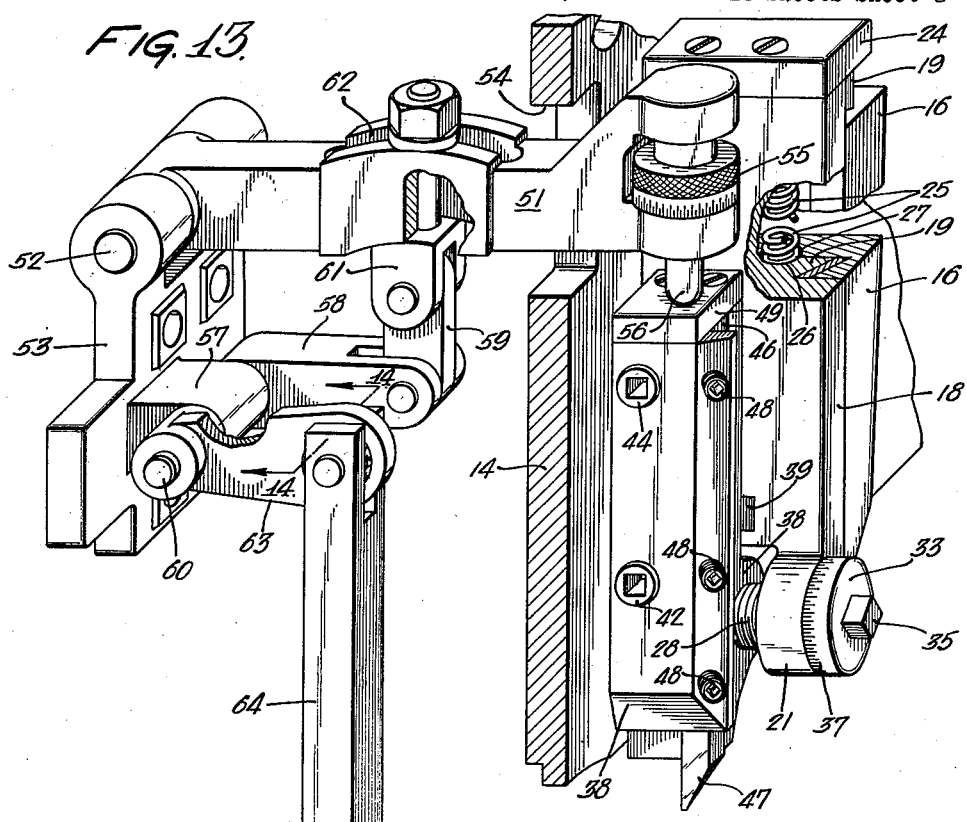
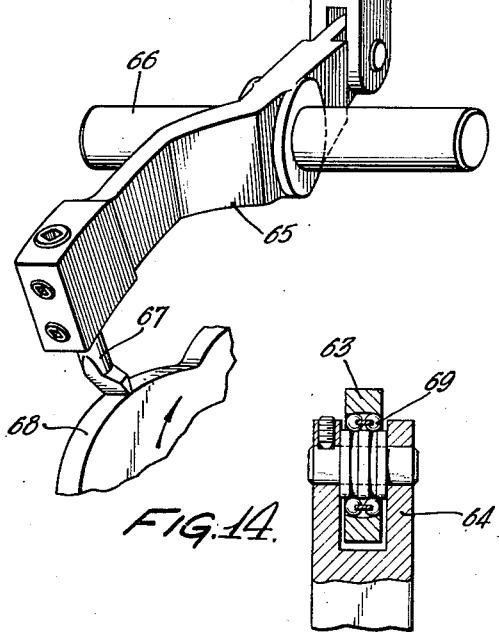
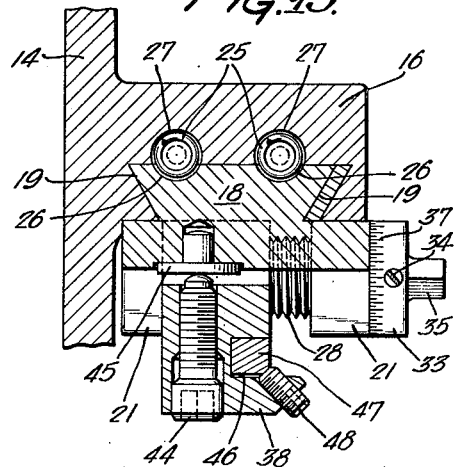
Fig. 13.
Fig. 14.
Fig. 15.
Inventor:
Nicholas P. Lloyd
by his Attorneys
Howson & Howson March 14, 1944. N. P. LLOYD 2,343,914
AUTOMATIC LATHE
Filed March 15, 1941 16 Sheets-Sheet 9
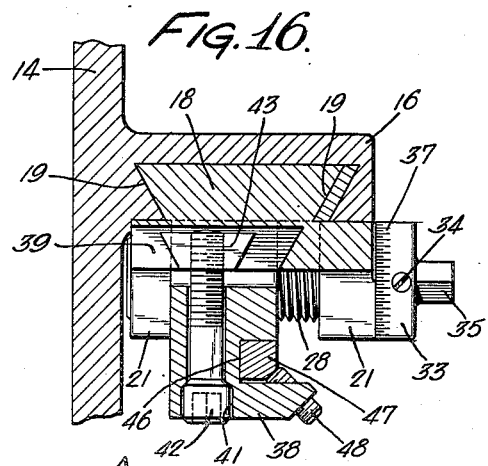
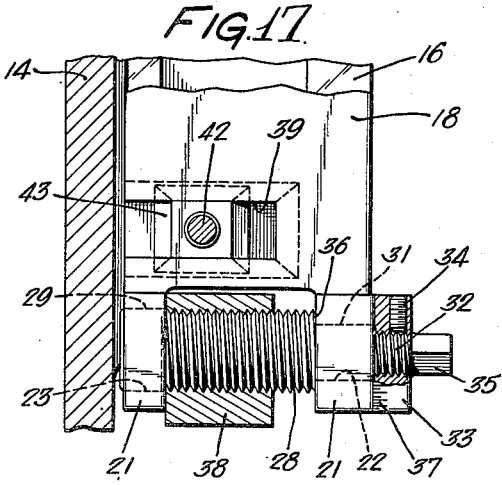
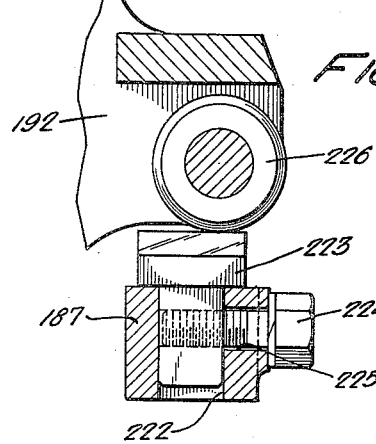
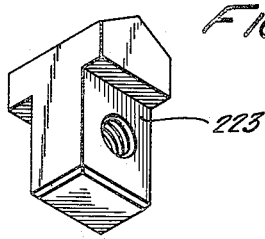
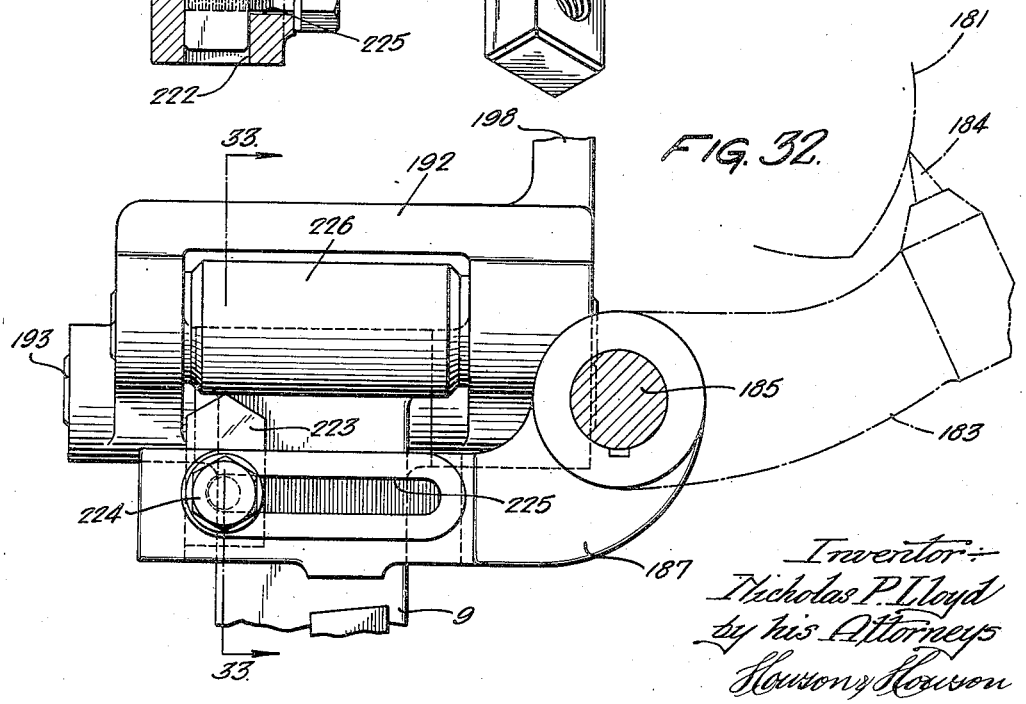
Inventor:
Nicholas P. Lloyd
by his Attorneys
Howson & Howson

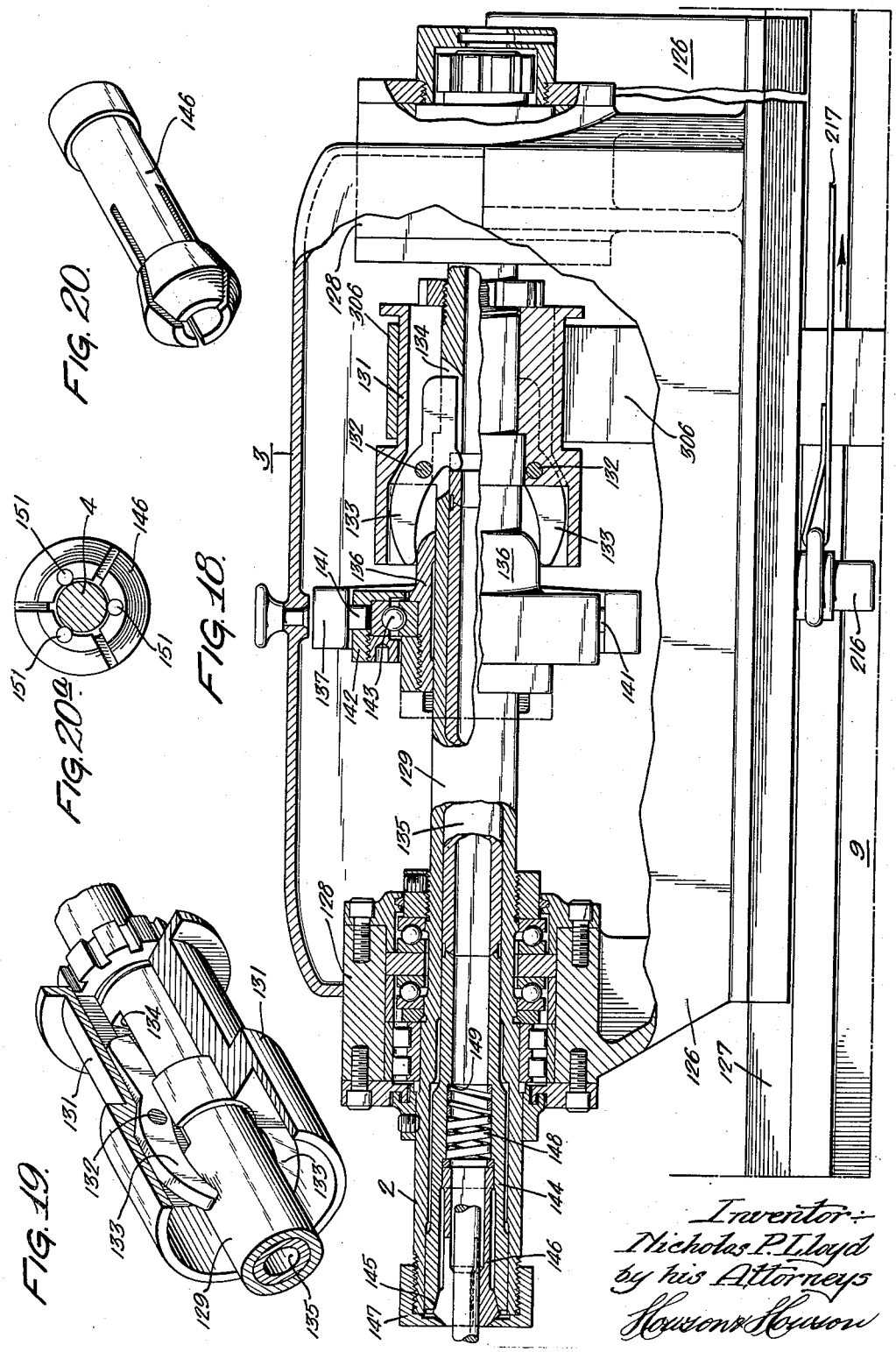

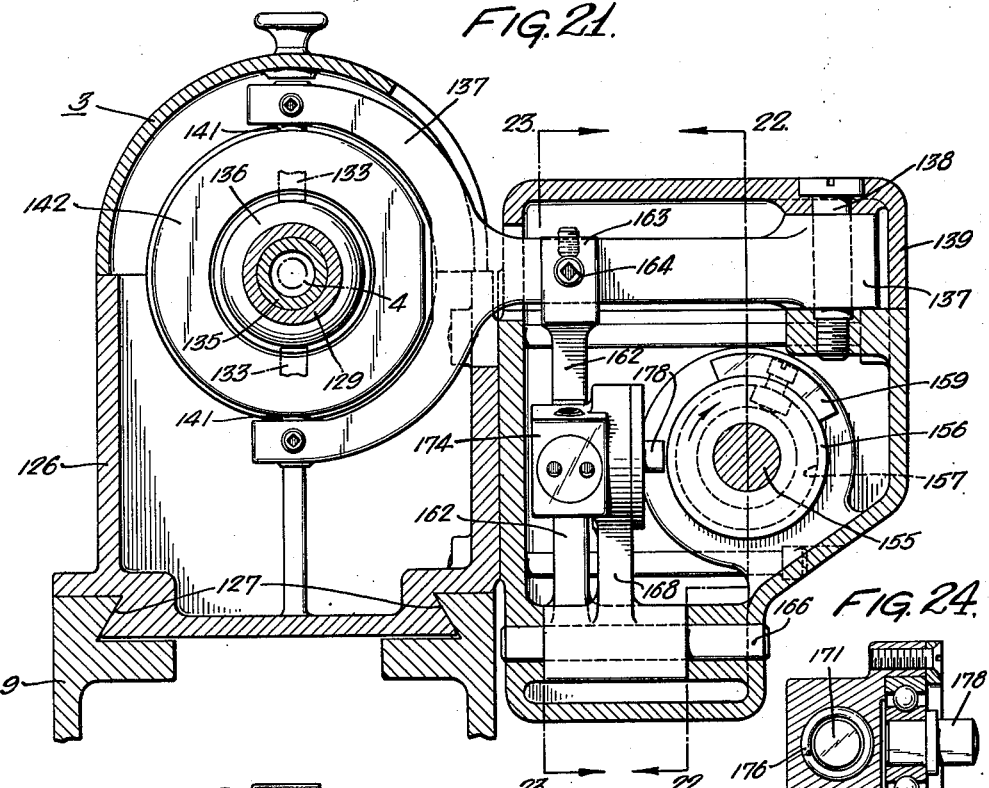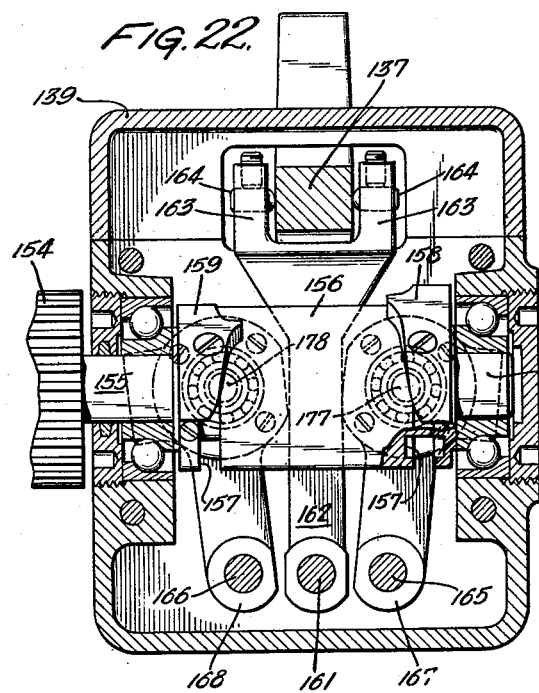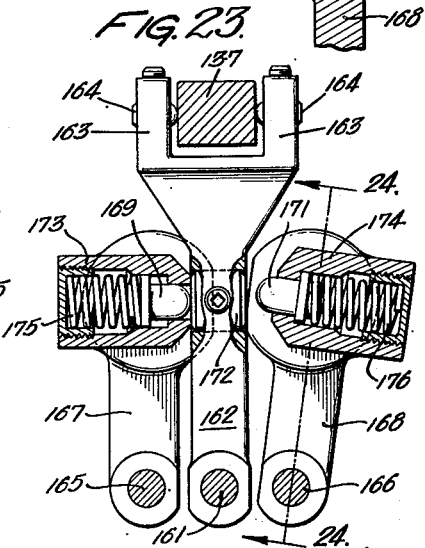

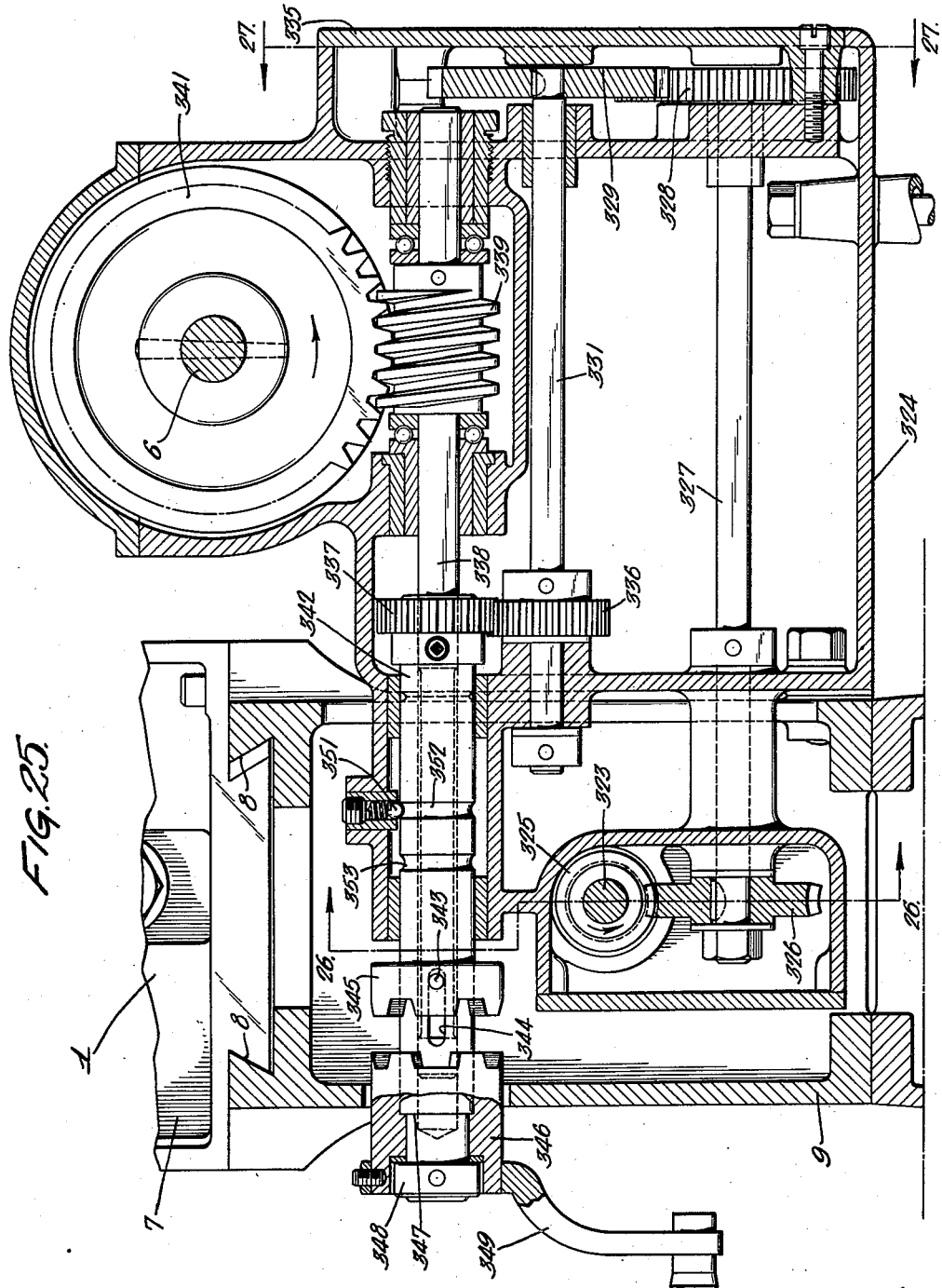

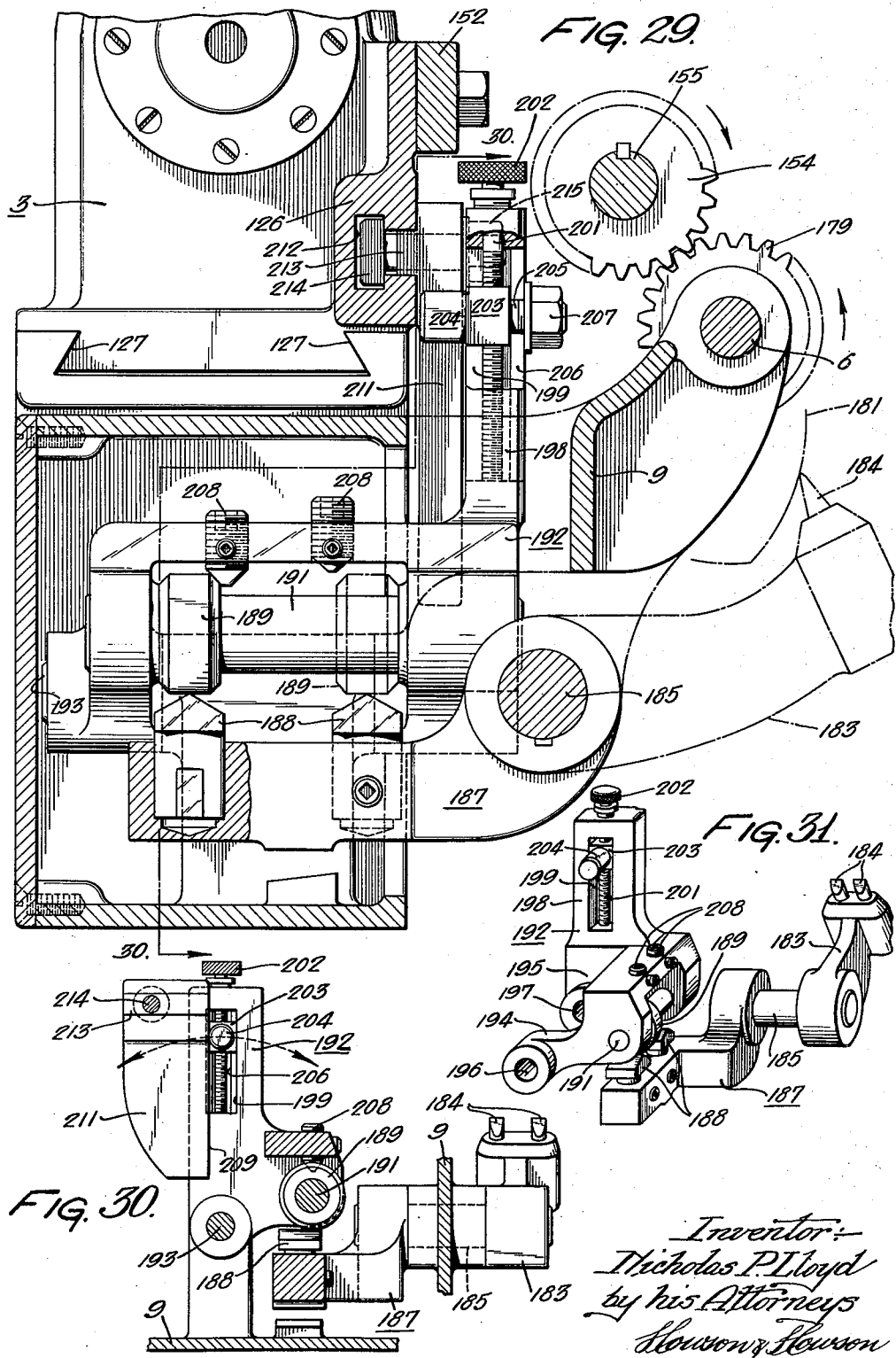

March 14, 1944.  N. P. LLOYD  2,343,914
AUTOMATIC LATHE
Filed March 15, 1941  16 Sheets-Sheet 15
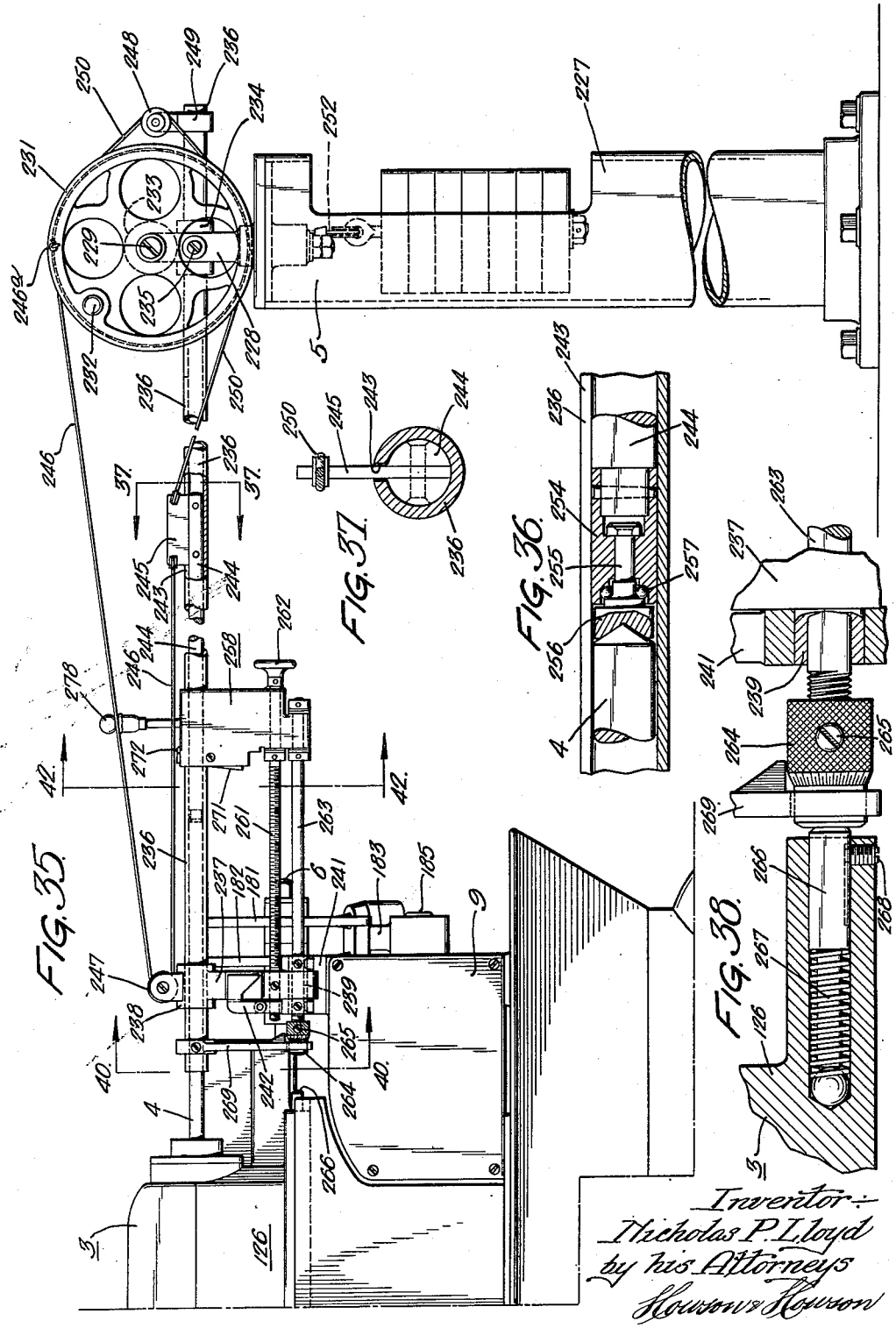
Inventor:
Nicholas P. Lloyd
by his Attorneys
Howson & Howson March 14, 1944.   N. P. LLOYD   2,343,914
AUTOMATIC LATHE
Filed March 15, 1941   16 Sheets—Sheet 16
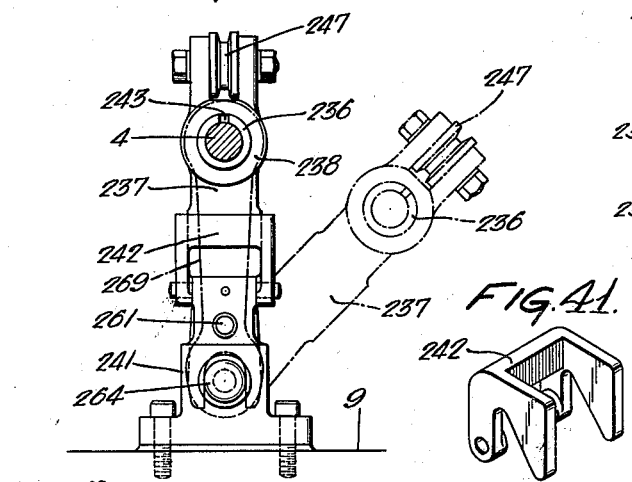
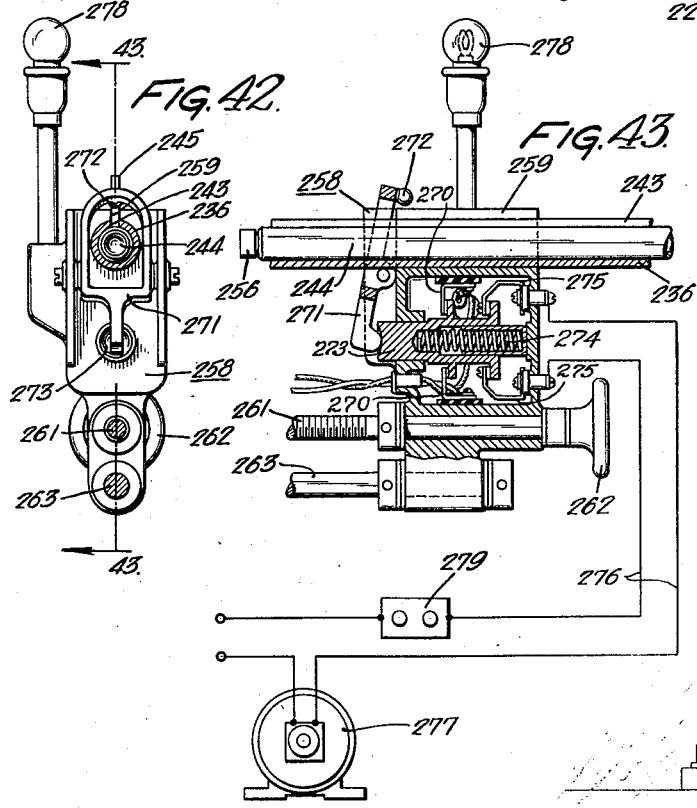
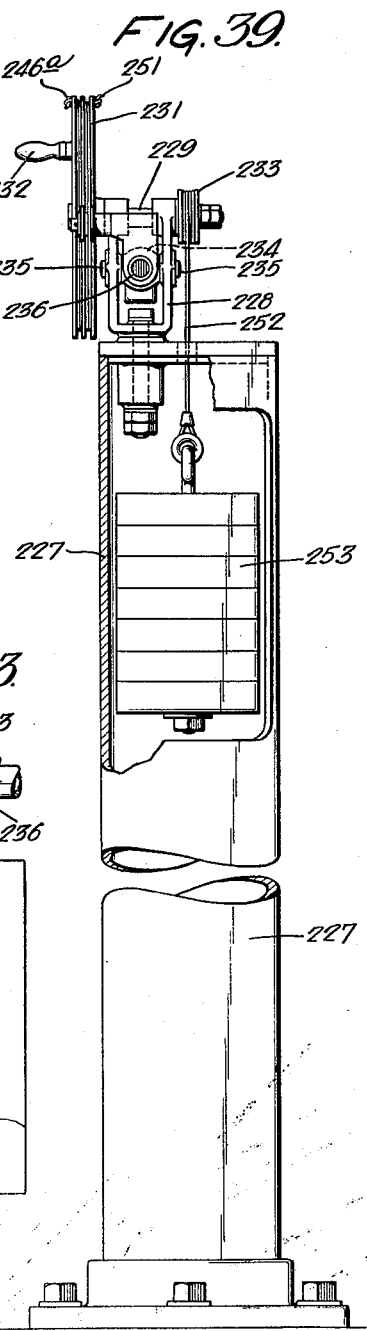
Inventor:
Nicholas P. Lloyd
by his Attorneys
Howson & Howson Patented Mar. 14, 1944

2,343,914

UNITED STATES PATENT OFFICE 2,343,914

AUTOMATIC LATHE

Nicholas P. Lloyd, Wynnewood, Pa.

Application March 15, 1941, Serial No. 383,634

13 Claims. (Cl. 82—2)

This invention relates to improvements in automatic lathes, and the invention resides in certain details of mechanism, structure, and assembly, hereinafter described, which are productive of a machine tool having in marked degree the desirable characteristics of precision, flexibility, facility of adjustment, safety, and capacity for operation at high speeds.

In the attached drawings:

Fig. 2 is a rear elevational view of the machine;

Fig. 3 is an enlarged side elevational view of the upper portion of the machine;

Fig. 4 is a top plan view of the machine;

Fig. 5 is a sectional view on the line 5—5, Fig. 1;

Fig. 6 is an enlarged front elevational view of the tool carrier;

Fig. 7 is a rear elevational and partial sectional view of the tool carrier;

Fig. 8 is a fragmentary side elevational view of a portion of the mechanism shown in Fig. 7;

Fig. 9 is a fragmentary sectional perspective view of the portion of the tool carrier mechanism shown in Fig. 8;

Fig. 10 is a fragmentary view in perspective illustrating details of the tool carrier;

Fig. 11 is a detached perspective view of one of the tool carrier elements;

Fig. 12 is a vertical sectional view of the tool carrier taken on the line 12—12, Fig. 6;

Fig. 13 is a detached sectional perspective view illustrating the details of the tool carrier-actuating mechanism;

Fig. 14 is a section on the line 14—14, Fig. 13;

Fig. 15 is a section on the line 15—15, Fig. 6;

Fig. 16 is a section on the line 16—16, Fig. 6;

Fig. 17 is a section on the line 17—17, Fig. 6;

Fig. 18 is a sectional elevational view of the sliding work spindle;

Fig. 19 is a fragmentary sectional perspective view of an element of the sliding spindle mechanism;

Fig. 20 is a view in perspective of another element of the sliding spindle mechanism;

Fig. 20a is a sectional view illustrating a modification of the spindle element illustrated in Fig. 20;

Fig. 21 is a sectional view on the line 21—21, Fig. 3;

Fig. 22 is a sectional view on the line 22—22, Fig. 21;

Fig. 23 is a sectional view on the line 23—23, Fig. 21;

Fig. 24 is a fragmentary sectional view on the line 24—24, Fig. 23;

Fig. 25 is a sectional view on the line 25—25, Fig. 3;

Fig. 26 is a sectional view on the line 26—26, Fig. 25;

Fig. 27 is a sectional view on the line 27—27, Fig. 25;

Fig. 28 is a detached view in perspective of one of the housing elements shown in Fig. 25;

Fig. 29 is a section on the line 29—29, Fig. 3;

Fig. 30 is a section on the line 30—30, Fig. 29;

Fig. 31 is a view in perspective illustrating details of the portion of the mechanism shown in Fig. 29;

Fig. 32 is a fragmentary sectional view illustrating a modification of an element of the mechanism shown in Fig. 29;

Fig. 33 is a section on the line 33—33, Fig. 32;

Fig. 34 is a detached view in perspective of an element of the mechanism shown in Fig. 33;

Fig. 35 is a side elevational view illustrating details of the stock stand;

Fig. 36 is a fragmentary sectional view illustrating a detail of the stock stand mechanism;

Fig. 37 is a section on the line 37—37, Fig. 35;

Fig. 38 is a fragmentary sectional view illustrating a detail of the stock control mechanism;

Fig. 39 is an end elevational and partial sectional view of the stock stand shown in Fig. 35;

Fig. 40 is a sectional view on the line 40—40, Fig. 35;

Fig. 41 is a detached view in perspective of one of the elements of the mechanism shown in Fig. 40;

Fig. 42 is a section on the line 42—42, Fig. 35, and

Fig. 43 is a section on the line 43—43, Fig. 42.

Figure 1:
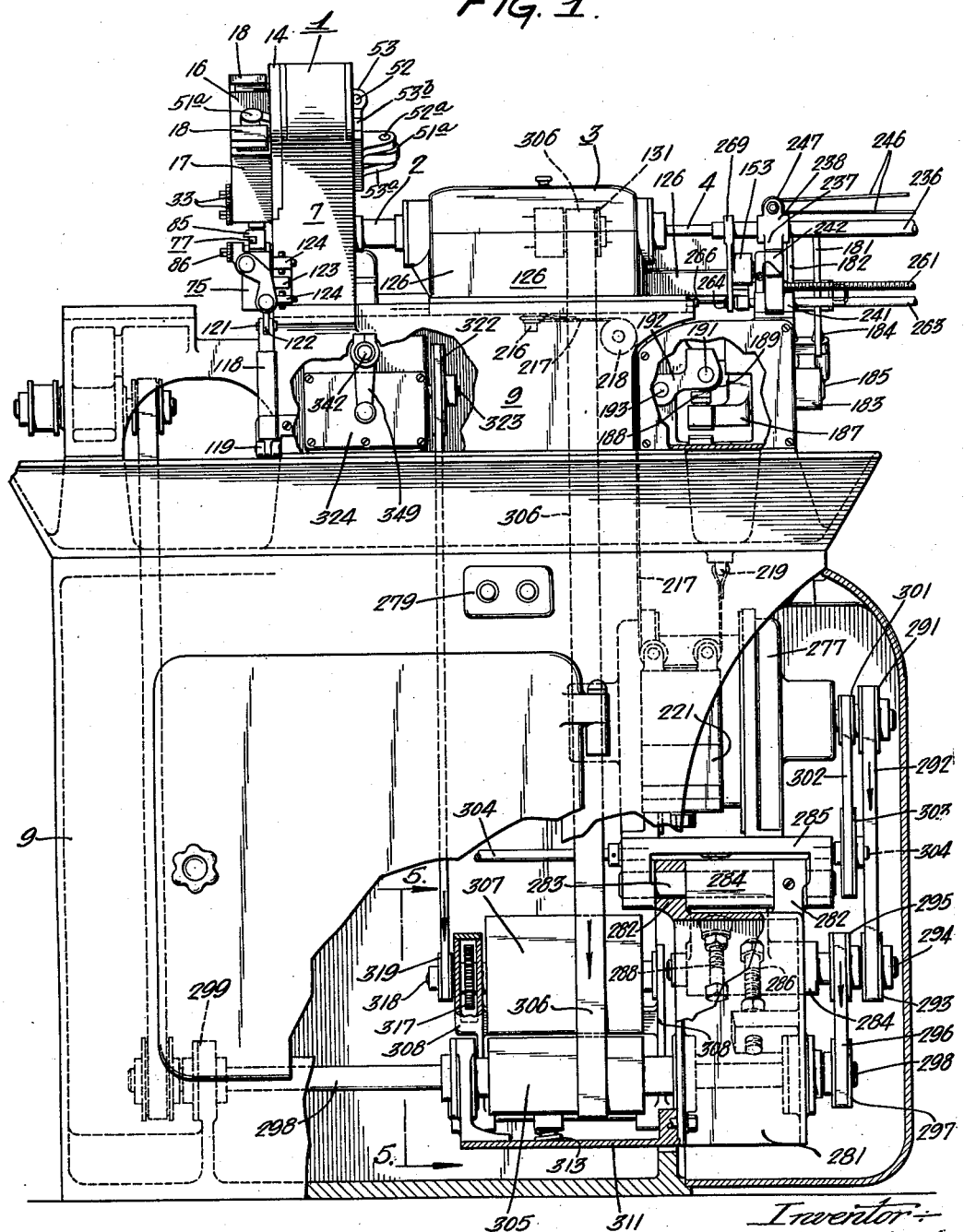
Figure 1 is a side elevational view of a lathe made in accordance with my invention.

With reference to the drawings, the machine comprises a relatively fixed tool carrier 1 and a rotary work spindle 2 which is mounted in a slide 3 for reciprocation with respect to the carrier 1. Bar stock designated by the reference numeral 4 is supported on a stand 5, see Fig. 35, rearwardly of the slide 3, and passes through the spindle 2 to the tool carrier. The feeding of the stock is effected by action of the sliding spindle 2, and the actuation of the spindle and of the slide 3, and also of the tools in the carrier 1, is effected through the medium of a single actuating shaft 6, which as best shown in Fig. 3 extends longitudinally of and at one side of the assembly.

Tool carrier

The tool carrier comprises a frame 7 which is adjustably supported in a dovetailed way 8 in the main frame 9 of the machine. Mounted in the frame 7 is a collet 11, see Fig. 12, the function of which is to support the stock 4 immediately adjacent the cut. The collet is adjustable in well known manner to closely fit the stock, and the tapered body of the collet is detachably secured by a ring nut 12 in a correspondingly tapered seat 13 of a bushing 10 which is detachably secured in the frame 7.

The frame 7 comprises a front plate 14, see Fig. 10, which has on the forward face thereof a plurality of dovetailed guides 15, 16 and 17, these guides converging in the direction of the collet 11. Slidably supported in each of these guides is a slide 18, see Fig. 11, said slide having a dovetailed portion 19 at the back which fits the associated dovetailed guide, and at one end a pair of spaced bosses 21, 21 having aligned openings, 22 and 23 respectively. At the opposite end, the slide is provided with a transverse flange 24 which overhangs the dovetailed portion 19. This flange forms a seat for the upper ends of coiled springs 25, 25 which are mounted in mating recesses 26, 26 and 27, 27 in the inner opposed faces of the slide 18 and its guide respectively and which exert pressure to resiliently support the slide in an elevated position in the guide.

Mounted for rotation in the bosses 21 is an adjusting screw 28. The screw has a terminal unthreaded portion 29 which fits into the relatively large aperture 23 in one of the bosses 21, and toward the other end an unthreaded portion 31 of smaller diameter which fits the relatively small aperture 22 of the other boss. Outwardly of the portion 31 is a threaded extension 32 of reduced diameter which receives a threaded collar 33, this collar being locked in place by a set screw 34. The threaded extension 32 terminates in a polygonal end 35 adapted for reception of a wrench whereby the screw may be turned in the supporting bosses. By reason of the shoulder 36 at one side of the journal portion 31, which shoulder abuts one face of the supporting boss, and the collar 33 which abuts the opposite face of the boss, the screw 28 is held against axial movement in the bosses. Preferably the collar 33 is provided with a scale 37, see Fig. 16, which provides an index of the angular position of the screw 28 in the bosses.

The screw passes through a correspondingly threaded aperture in a tool-supporting element 38, said element thereby being adjustable by rotation of the screw 28 transversely between the bosses 21, 21 of the slide 18. The slide 18 has in its outer face and immediately above the bosses 21 a transverse dovetailed slot 39, and the associated element 38 has an opening 41 through which a bolt 42 extends into the said slot 39. A rectangular dovetailed nut 43 fitted to the recess 39 receives the inner end of the bolt 42 whereby when this bolt is tightened, the element 38 is clamped solidly to the slide 18 in adjusted position between the bosses 21, 21.

Threaded through the element 38 from the outer face at a point near the upper end thereof is an adjusting screw 44, the inner end of this screw, see Fig. 15, bearing against a hardened steel button 45 set into the outer face of the slide 18. Through the medium of this screw 44, the angular position of the element 38 with respect to the axis of the screw 28 as a center may be adjusted. As shown in Figs. 15 and 16, the element 38 has a longitudinal recess 46 for reception of the cutting tool 47, and the tool is clamped solidly in the recess by means of set screws 48.

It will be apparent that the foregoing arrangement provides for adjustment of the point of the tool in directions both axially and tangentially of the stock supported in the collet 11. The device has another important characteristic relating to the clamping action of the bolt 42. When this bolt is tightened, it has the effect of compressing the threads of the tapped hole in element 38 into the tapered spaces between the threads of the screw 28, thereby eliminating any freedom between these parts required for adjustment and maintaining the preliminary alignment of the tool with respect to the axial movement of the stock. Also, by reason of the pressure thus exerted upon the screw 28, the latter is clamped solidly in position preventing any displacement of the tool from vibrational or other causes.

The upper end of the element 38 is provided with a cap plate 49 which forms a bearing for the free end of a lever 51. This lever is supported on a pivot pin 52 carried by a bracket 53 secured to the rear of the frame 7, see Figs. 7, 12 and 13. The lever projects through an opening 54 in the front plate 14, and carries at its forward end a micrometer adjusting screw designated generally by the reference numeral 55, the lower end 56 of this screw bearing upon the plate 49.

Pivotally supported in a boss 57 on the inner side of the bracket 53 is a lever 58 which is connected through the medium of a link 59 and a shackle 61 with the lever 51. The shackle is adjustably supported in a slot 62 which extends longitudinally of the lever 51, see Fig. 12, so that by adjustment of the shackle, the throw of the lever 51 corresponding to any given movement of the lever 58 may be varied.

Rigidly secured to the pintle 60 of the lever 58 is an arm 63 which is connected through a rod 64 with one end of a lever 65, this lever being mounted on a shaft 66 supported in the frame 7. The other end of the lever 65 carries a cam follower 67 which is adjustably secured in the lever, as illustrated in Fig. 13, and which bears against a cam 68 on the shaft 6. It will be noted that the rod 64 is connected to the lever 63 through the medium of a bearing 69, see Fig. 14, which provides for slight angular movement of the rod 64 transversely of the plane of the lever 63, while still maintaining a close connection between these elements.

It will be apparent that with the arrangement described above, the cam 68 in rotating will cause the lever 51 to be drawn downwardly to thereby advance the tool 47 toward the work, this advance movement of the tool being effected by pressure exerted through the lever 51 upon the element 38, and through this element upon the slide 18. Retractive movements of the tool permitted by the cam 68 are effected through the medium of the springs 25 which tend to move the slides 18 upwardly in their guides as previously described, these springs also functioning to hold the follower 67 firmly on the cam surface. It will be noted that the transmission elements operate under tension in feeding the tool against the work.

As previously set forth, there are in the present instance three individual cutting tools mounted on the front plate 14 of the tool carrier 1. These tools, which are identified in Fig. 6 by the reference numerals 47, 47a and 47b, are operatively associated, respectively, with the front plate dovetailed guides 16, 15 and 17. The mountings for the three tools are identical, as described above, and the various elements of the mountings are, therefore, identified by the same reference numerals.

The tool-actuating mechanism described above is that which is immediately associated with the tool 47, shown at the center in Fig. 6. Similar actuating mechanisms, differing from that described only in the shape of certain of the elements, are provided for actuating the tools 47a and 47b from separate cams carried by the shaft 6. The actuating mechanism for the tool 47a is supported upon a bracket 53a, at the back of the frame, corresponding to the bracket 53 previously described, and a corresponding bracket 53b constitutes the immediate support for the actuating mechanism for the tool 47b. The connecting rod 64a, which constitutes an element of the actuating mechanism for the tool 47a and which corresponds to the connecting rod 64 of the actuating mechanism for the tool 47, is connected to a cam lever 65a carried by the shaft 66 in a position adjoining the cam lever 65, and this cam lever is operatively associated in the manner previously described with a cam 68a on the shaft 6. Similarly the connecting rod 64b forming an element of the actuating mechanism for the tool 47b is connected with a cam lever 65b which adjoins the cam lever 65 on the shaft 66, and the lever 65b is operatively associated, as previously described, with a cam 68b on the shaft 6, see Fig. 3. The actuations of the tools 47, 47a and 47b are, therefore, entirely independent and under the control of the individual cams 68, 68a and 68b, which cams, however, are all carried by the shaft 6, and, therefore, move in positive synchronization.

Referring further to Fig. 3, it will be noted that each of the cams 68, 68a and 68b has an immediately adjoining companion cam designated respectively 71, 71a and 71b. These cams are so arranged with respect to their companion cams that when the follower 67, the extremity of which is offset, as best shown in Fig. 13, is turned through an angle of 180°, the follower will then be in a position to engage the said companion cam. Thus by adjusting the follower 67 through an angle of 180°, the follower may be made to engage selectively either one of two cams, thereby adding flexibility to the operation of the machine and avoiding the necessity for frequent changing of the cams on the carrier shaft 6.

Pivotally secured to the lower portion and at the front of the frame 7, by means of a tapered-head bolt 72, is a dovetailed transverse guide member 73, on opposite ends of which are supported sliding blocks, 74 and 75 respectively. The blocks 74 and 75 constitute sliding supports for cutting tools 76 and 77 respectively. At the inner end and at the top of the block 74 are two spaced bosses 78 and 79 which form bearings for an adjusting screw 81 corresponding to the adjusting screws 28 of the slides 18 previously described. The adjusting screw 81 is secured in the bosses 78 and 79, in the same manner as the adjusting screws 28 in the bosses 21, 21 of the carrier elements 18, and is provided with a polygonal end 82 for reception of a wrench, by means of which the adjusting screw is turned. Engaged with and supported by the screw 81 is a tool-supporting element 83 in which the cutting tool 76 is clamped by means of set screws 84. Rotation of the screw 81 has the effect of adjusting the element 83 and the tool 76 in the block 74 axially of the work stock supported in the collet 11.

A similar support element 85 is mounted on an adjusting screw 86 in the block 75, and in this element is clamped the tool 77, by means of set screws 87. The element 85 is provided at its outer end with an adjusting screw 88, the lower end of which bears against a hardened steel insert 89 in the block 75. By adjusting the screw 88, the element 85 and the tool 77 may be adjusted angularly about the axis of the screw 86 as a fulcrum in a plane normal to the longitudinal axis of the stock-supporting collet 11. The element 85 also carries a bolt 91, the lower end of which is engaged by a rectangular tapered nut 92 slidably held in a transversely extending dovetailed recess 93 in the block 75, and by tightening the bolt 91, the element 85 is clamped solidly in adjusted position to the block 75. The element 83 is provided with an adjusting screw 94 corresponding to the adjusting screw 88 of the element 85, and is provided also with a clamping bolt 95 corresponding to the bolt 91. It will be noted that the adjusting and clamping means is the same as that previously described in connection with the tools 47, 47a and 47b, and that the device is correspondingly effective to maintain the tools 76 and 77 solidly and immovably in adjusted position and in accurate alignment with respect to the axial movement of the stock.

In each end of the pivotally mounted guide bar 73 is a pair of recesses 96, 96, and in each of these recesses is mounted a coiled spring 97. Each of the blocks 74 and 75 is provided with an end plate, 98 and 99 respectively, which plates overlie the ends of the recesses 96 and form a seat for the springs 97. By way of the end plates 98 and 99, the springs 97 exert resilient pressure tending to force the blocks 74 and 75 outwardly on the respective ends of the guide bars 73.

The guide bar 73 has an extension 101, see Figs. 6 and 9, and this extension has bosses 102, 103 within which is supported an adjustable stop 104, which by engagement with the end plate 99 limits the outward movement of the block 75 under the pressure of the springs 97. By means of the stop 104, the block 75 may be adjusted to bring the cutting edge of the tool 77 in desired propinquity to the stock-supporting collet 11 and to the work supported in this collet. A corresponding adjusting screw 105 is supported in lugs 106, 106 on the extension 101, and the inner end of this screw bears against the end of a rod 107 which is slidably supported in a longitudinal bore 108 in the guide member 73. The opposite end of the rod 107 engages one end of a lever 109 which is pivotally supported on a bracket arm 111 secured to the end of the guide bar 73, and the opposite end of the lever 109 bears against a button 112 on the end plate 98 of the block 74. The adjusting screw 105 thereby constitutes a stop limiting the outward movement of the block 74 under pressure of the springs 97, and constitutes a means whereby the tool 76, which is supported on the block 74, may be adjusted relatively to the stock-supporting collet 11.

Secured to the guide bar 73 is a bracket 113 which carries on its projecting end a cam follower 114, and this follower engages one or both of a pair of cams 115 and 116 secured to the shaft 6, see Fig. 3. Thus the cams, either individually or jointly, may operate to rock the guide bar 73 on its pivot 72, thereby bringing one or other of the cutting tools 76, 77, depending on the direction in which the said bar is tilted, into cutting engagement with the work stock supported, as previously described, in the collet 11. The cam follower 114 is forcibly resiliently retained in engagement with the cam or cams 115, 116 by means of a spring 117 which is mounted in a telescopic link 118, one end of which is pivotally supported on a bracket 119, see Figs. 1 and 2, secured to the main frame 9 of the machine, and the other end of which is pivotally secured at 121 to an arm 122 depending from the guide bar 73. At the back of the guide bar 73 is a projecting pin 123 which extends into the space between a pair of bosses 124, 124 on the tool carrier frame 7. Each of the bosses 124 carries an adjusting screw 125, and these screws constitute stops limiting the extent of the tilting of the guide bar 73.

From the foregoing description, it will be apparent that the cutting tools, either singly or in various combinations, may be brought into cutting relation to the work stock supported in the collet 11, the actuation of the cutting tools being controlled by a plurality of cams carried by the common shaft 6. It will be apparent also that provision is made for accurately adjusting the individual cutting tools axially of the stock and also in planes normal to the longitudinal axis of the stock. The construction provides for elimination of all play between the cutting tools and the actuating cams, and maintenance of the tools in extremely accurate adjustment.

The work spindle

As previously set forth, the rotary spindle 2 is mounted in a slide 3 for longitudinal reciprocation with respect to the tool carrier 1. The slide 3 is in the form of a housing, the base member 126 of which is supported for sliding movement in a dovetailed guide 127 in the main frame 9 of the machine. The spindle 2, see Fig. 18, is supported in bearings, designated generally by the reference numeral 128, in the housing 126, said bearings including anti-friction thrust elements, and the spindle being held securely against axial movement in the housing. The spindle itself comprises an outer tubular member 129, to which is secured, as illustrated in Figs. 18 and 19, a pulley 131, by means of which pulley the spindle is rotated, as hereinafter described. Pivotally secured at 132 within the pulley member 131 is a pair of levers 133, these levers extending through slots 134 in the tubular member 129 for operative engagement with one end of an inner sleeve 135 slidably supported within the member 129. The levers 133 are actuated about the pivots 132 by means of a sleeve 136 slidably mounted on the spindle member 129, this sleeve being in turn actuated through a forked lever 137. The lever 137 is pivotally supported at 138 in a casing 139 secured to the side of the housing 126, as best shown in Fig. 21. The bifurcations of the lever 137 carry pins 141 which engage a collar 142 secured to the sleeve 136 through the medium of an anti-friction bearing 143.

The enlarged extremity 144 of the sleeve 135 is adapted for camming engagement at 145 with the resilient jaws of a collet 146, this collet being mounted within the enlarged end 144 of the sleeve 135, and being confined within the spindle member 129 by a flanged collar 147 threaded on the end of the latter. A spring 148 is confined between the inner end of the collet 146 and a shoulder 149 in the sleeve 135, and exerts pressure tending to retain the collet in advanced position in seating engagement with the flanged collar 147. When the sleeve 136 has been moved to the position shown in Fig. 18, the said sleeve has a camming action on the proximate ends of the levers 133, forcing the said ends outwardly and causing the levers to shift the sleeve 135 to the left, thereby flexing the jaws of the collet 146 inwardly. Movement of the sleeve 136 to the left, as viewed in Fig. 18, releases the pressure on the levers 133 and permits the spring 148 to shift the sleeve 135 to the right, thereby releasing the jaws of the collet 146 and permitting them to expand. The spring 148 also functions, as previously described, to maintain the collet 146 in the normal advanced position bearing against the flange of the collar 147. The collet 146 is shown in Fig. 20. If desired, the jaws of the collet may be provided with wear resistant inserts 151, as shown in Fig. 20a composed, for example of cemented carbide or other relatively hard material. Such inserts will preferably be provided also in the jaws of the collet 11 previously described.

The housing 126 of the slide 3 is provided with a bracket extension 152, see Figs. 3 and 4, in which is journaled, at 153, one end of an elongated gear 154, the other end of this gear being journaled in the casing 139. Fixed to the shaft 155 of the gear 154 within the casing 139, see Fig. 22, is a cylinder 156, said cylinder having therein circumferential T-slots 157, 157. In each of these slots is adjustably secured a cam, 158 and 159 respectively, and it is these cams rotating with the cylinder 156 which actuate the lever 137 to shift the sleeve 136.

Pivotally supported upon a pin 161 in the lower end of the casing 139 is a lever 162. The upper bifurcated end of this lever, see Fig. 22, embraces the lever 137, and the bifurcations 163, 163 carry hardened set screws 164 which engage the opposite sides of the lever 137. Pivotally supported upon pins 165 and 166 at opposite sides of the pin 161 are levers 167 and 168. Each of these levers carries a spring-pressed pin, 169 and 171 respectively, which are arranged for engagement with the opposite sides respectively of a hardened steel plug 172 set into the shank of the lever 162. The pins 169 and 171 project through an opening in the face of a hollow boss, 173 and 174 respectively, on the levers 167 and 168, and springs 175 and 176 confined within the bosses behind the pins resiliently urge the latter into an advanced projected position. The apertured faces of the bosses 173 and 174 are also adapted for contact with the opposite faces of the plug 172, as hereinafter described.

Each of the levers 167 and 168 also carries a pin, 177 and 178 respectively, these pins being supported on anti-friction bearings and projecting into the paths of the cams 158 and 159. The cams are so formed and are so relatively positioned on the cylinder 156 that as the cylinder rotates, the cams function by contact with the pins 177 and 178 to actuate the levers 167 and 168 in timed relation effecting a periodic oscillation of the lever 162. In each case, as the levers 167 and 168 advance toward the lever 162, the initial contact occurs between the pins 169 and 171 and the plug 172 of the last-named lever. As a result, the said pin is forced back into its housing, and the housing itself, 173 or 174 as the case may be, then comes into engagement with the said plug. The pressure of the springs 175 and 176 is not sufficiently great to displace the lever 162, so that the actual shifting of the lever is initiated by the positive contact therewith of the housings 173 and 174. The springs have the effect, however, by their pressures on the lever 162, of partially overcoming the inertia of the parts in advance of the contact of the housings 173 and 174 with the said lever, and function also in effecting a rapid shifting of the lever 162 after movement of the lever has been initiated. The movements of the auxiliary shifting levers 167 and 168 are correlated and timed so as to maintain the oscillations of the lever 162 and the magnitude of the oscillations under accurate control so that the resulting reciprocations of the collet-actuating sleeve 136 are closely and accurately regulated. It is to be noted that the aforedescribed actuating mechanism for the sleeve 136, and the use therein of the cam-actuated auxiliary levers 167 and 168, makes possible a rapidity of action that could not be obtained if the actuating cams were made to operate directly on the sleeve or on the lever 137, and that the said mechanism thereby contributes in material degree to the rapid operation which is characteristic of the machine as a whole.

It will be noted by reference to Figs. 3 and 4 of the drawings that the gear 154 receives its rotational movement from a pinion 179 carried by the shaft 6, whereby the actuations of the collet clutch occur in synchronism with the actuation of the cutting tools, as previously described. The actuations of the collet 146 also occur in accurately timed relation with the reciprocatory movements of the spindle slide 3, as now to be described.

As shown in Figs. 3 and 4, the shaft 6 carries at its rearward end a pair of cams 181 and 182. These cams operate upon a lever 183, said lever having secured in the end thereof a pair of cam followers 184 which immediately engage the surfaces of the said cams. The lever 183 is secured to a shaft 185, which shaft is journaled at 186 in the main frame 9 of the machine. Also secured to the shaft 185 is a lever arm 187, and this arm carries a pair of hardened steel pins 188. The pins 188 are adapted selectively to engage a hardened sleeve 189 which is carried by a pin 191 forming an element of a bell crank lever 192, this lever being pivotally supported on a pivot pin 193 in the main frame 9. The form of the bell crank lever 192 is best shown in Figs. 30 and 31. The lever comprises two arms 194 and 195 which have aligned apertures 196 and 197 for reception of the pivot pin 193. The arm 195 is extended upwardly as shown at 198, and this extension has a longitudinal recess 199 through which extends an adjusting screw 201, this screw projecting through the top of the extension 198 and having at its upper end a knurled head 202 by means of which the screw may be turned. Guided in the recess 199 is a block 203 having threaded engagement with the screw 201, and this block carries a pin 204 which projects beyond the inner face of the extension 198. At its opposite side, the block 203 has a projecting stud 205 which extends through a slot 206 at the forward side of the recess 199, and this stud carries a nut 207 which, when tightened against the side of the extension 198, functions to secure the block solidly in adjusted position in the recess. It will be noted by reference to Fig. 29 that the sleeve 189 is slidably adjustable on the pin 191 and between the arms 194 and 195 to positions to engage either one or other of the pins 188 of the lever arm 187, and that means is provided in the form of set screws 208 for retaining the sleeve 189 in the respective positions of adjustment.

The pin 204 engages the vertical face 209 of a cam 211, which cam is secured to the housing 126 of the slide 3. As shown in Fig. 29, the housing is provided with a longitudinally extending T-slot 212, and the cam 211 has a rib 213 which extends into the outer side of this slot. A bolt 214 has its head slidably engaged in the slot 212 and extends through the rib 213 and through the body of the cam 211 to the outer face thereof, said bolt having on its outer end a nut 215 for solidly clamping the cam member 211 to the housing. This method of support provides for adjustment of the cam 211 longitudinally of the slot 212 and of the housing 126.

Depending from the under side of the housing 126 of the slide 3 is a stud 216, to which is secured a strap 217. This strap, see Fig. 1, passes over a pulley 218, and has its ends secured to a shackle 219 on the main frame. Supported in the loop of the strap 217 between the pulley 218 and the anchor 219 is a weight 221, this weight exerting a force through the strap tending to draw the slide 3 rearwardly in its dovetailed guide away from the tool carrier 1. The weight thereby functions to hold the cam element 211 against the pin 204, and through the levers 192 and 187 to hold the lever arm 183 against the cams 181, 182. Rotation of the cams through the aforedescribed transmission train will cause the carriage 3 to be advanced toward the tool carrier 1, and will release the slide to permit the weight to draw the latter rearwardly as described. The extent to which the carriage is advanced under the action of the cams 181, 182 will depend upon the form of the cams and the position of the pin 204 from the axis 193 of the lever 192. The movement of the slide 3 under cam actuation may also be varied by shifting the sleeve 189 on the pin 191, it being apparent that when the sleeve is in position for engagement with that one of the pins 188 which is farthest removed from the pivotal axis 185 of the arm 187, a given angular movement of the lever, composed of the arms 183 and 187, will give the slide 3 a greater movement than when the sleeve 189 is in engagement with the pin 188, which is relatively close to the shaft 185.

In this connection, reference is made to Figures 32 to 34, inclusive, which show a modification of the mechanism illustrated in Figs. 30 and 31. In this case, the lever arm 187 is provided with a vertical slot 222 in which is adjustably mounted a single pin 223. The pin 223 is secured in adjusted position by means of a screw 224 which extends through a slot 225 in the side of the arm 187, and is threaded into the base of the pin 223. The bell crank lever 192, instead of the pin 191 and collar 189 of the previously described embodiment, carries a sleeve 226 of uniform diameter which is engaged by the pin 223. With this arrangement, the distance of the pin 223 from the pivotal axis 185 may be varied to any extent required within the length of the sleeve 226, thereby affording a greater latitude of adjustment.

The cams 181, 182 may be used individually or jointly to control the reciprocatory movements of the slide 3, and it will be noted that since these cams are carried by the shaft, the reciprocatory movements of the slide 3 occur in positive synchronism with the actuation of the tools in the carrier 1 and of the collet clutch 146 in the work spindle.

Stock stand

As previously stated, the bar stock, designated by the reference numeral 4, is supported on a stand 5 at the rear of the machine. With reference more particularly to Figures 35 to 43, inclusive, the stand comprises a tubular standard 227, on the top of which is a swivel bracket 228. Journaled in the top of the bracket is a shaft 229, to one end of which is secured a sheave 231 having a handle 232. To the opposite end of the shaft is secured a smaller sheave 233. A collar 234 is supported on trunnions 235 between the arms of the bracket 228, and secured in this collar is a tube 236 which extends forwardly towards the back of the machine and which is supported at its forward end on an arm 237, the tube extending freely through a boss 238 at the top of this arm. The arm 237 is pivotally supported upon a bushing 239 which is secured in a bracket 241 attached to the main frame 9, and a pivoted latch 242, see Fig. 41, on the bracket 241 functions normally to maintain the arm 237 in the upright position, as shown in Figs. 35 and 40. By releasing the latch 242, the arm 237 may be swung outwardly about the bushing 239 to a position indicated in broken lines in Fig. 40. This outward movement of the arm 237 is accompanied by an angular movement of the bracket 228 upon its vertical swivel, and by an angular movement within the bracket of the tube-supporting collar 234. There is also a slight resulting flexure of the tube 236, which flexure, however, does not interfere with the functioning of the tube as hereinafter described.

As illustrated in Fig. 40, the tube 236 is slotted at the top, as indicated at 243, and slidably supported within the tube is a plunger 244 having a fin 245 which projects upwardly through the slot 243. A cable 246, see Fig. 35, is secured to the forward end of the fin 245, this cable passing forwardly above the tube 236 and around a pulley 247 which is journaled at the top of the arm 237. The cable 246 then passes rearwardly to the top of the sheave 231, where it is secured at 246a to the side flange of the sheave. A second cable 250 is secured at 251 to the opposite flange of the sheave, and this cable extends downwardly on the sheave, around a small pulley 248 carried by a collar 249 on the rear end of the tube 236, and thence under the sheave 231 to the rear end of the fin 245. Rotary movement of the sheave 231 in a clockwise direction as viewed in Fig. 35 will pay out the cable 250 and draw in the cable 246, with the result that the plunger 244 is moved toward the machine, whereas counterclockwise rotation of the sheave will retract the plunger. It will be understood that in the retracted position as shown in Fig. 35, the major portion of the cable 250 is wound on the sheave.

A third cable 252 is secured to and passes around the pulley 233, this cable extending through an opening in the top of the standard 227 and having suspended from its lower end a weight 253 which is housed within the standard as illustrated. This weight tends to turn the sheave 231 in the clockwise direction as viewed in Fig. 35, and thereby through the cable 246 tends to draw the plunger 244 forwardly in the tube 236. The bar stock 4 is carried within the tube 236, and may be inserted in the tube from its forward end after turning the arm 237 away from its normal vertical position to the dotted line position shown in Fig. 40. The inner end of the stock is engaged by the forward end of the plunger 244, so that the plunger exerts pressure tending to force the stock forwardly in the tube. The forward end of the plunger 244, see Fig. 36, has secured thereto a cylindrical member 254, in which is rotatably mounted an element 255, this element having a head portion 256 which directly engages the inner end of the bar stock 4. Interposed between the head 256 of the element 255 and the member 254 is a thrust bearing 257 which provides for free rotation of the element 255 in its supporting member.

Slidably supported on the tube 236 is a bracket 258, this bracket being slotted at the top, as indicated at 259, in alignment with the slot 243 of the tube 236. Secured in the lower portion of the bracket 258 is an adjusting screw 261 which extends forwardly and is threaded through the arm 237. By turning the screw 261, through a hand wheel 262, the bracket 258 may be adjusted on the tube 236 toward or away from the bracket 241. Also secured in the bracket 258 below the adjusting screw 261 is a rod 263, the forward end of this rod sliding freely through the bushing 239 which forms the pivotal support for the arm 237. A tip 264 is adjustably secured to the forward end of the rod 263, the tip in the present instance being threaded on the rod and being provided with a set screw 265 by means of which the tip may be clamped to the rod in adjusted position. The forward end of the tip 264 is adapted to engage a pin 266 slidably supported in a recess in the rear end of the housing 126 of the slide 3. A spring 267 is confined in the recess behind the pin 266 and exerts pressure to force the pin outwardly of the recess. A set screw 268 fits into a spline in the bottom of the pin 266 and limits the sliding movement of the pin in the recess. The rod 263 thereby constitutes a limit stop for the rearward movement of the slide 3 under the action of the weight 221, and the position of the stop can be regulated through the adjusting screw 261, and more exactly through adjustment of the head 264 on the end of the stop rod 263. The primary purpose of the counterweight 221 is to maintain contact of the followers 184 with the cam or cams 181, 182. Normally the cam will be made to produce the required overall length of the formed piece and the subdivisions of that length in different diameters. By use of the rod 263, the rearward movement of the slide 3 may be stopped short of the position of extreme retraction provided for by the cam itself, and the overall length of the piece will be modified accordingly. Various dimensions are obtainable in this manner without changing the cam, merely by preventing the follower from going to the bottom of the cam valley. Depending from the forward end of the tube 236 is an arm 269, the lower bifurcated end of which embraces the forward end of the tip 264, this arm being adjustable longitudinally of the tube 236 and functioning to brace the forward end of the stop rod 263.

In inserting the bar stock in the machine, the plunger 244 is retracted to the rear end of the tube, by turning the sheave 231 manually through the medium of the handle 232, and the tube then displaced laterally by pivoting the arm 237, as previously described, so as to permit of insertion of the bar stock 4 behind the plunger 244. The bracket 237 is then moved to its normal position bringing the end of the tube 236 in alignment with the hollow spindle 2, and permitting insertion of the bar stock through the spindle.

Referring to Figures 35, 42 and 43, it will be noted that the member 258 carries at its forward end a pivoted lever 271, said lever being shaped, as shown in Fig. 42, to embrace the tube 236, and having at its upper end a spherical boss 272 in alignment with the slots 259 and 243 of the member 258 and of the tube 236 respectively. The boss 272 lies in the path of the fin 245 of the plunger 244 so that when the plunger is sufficiently far advanced, it will engage the upper end of the lever 271 and will shift the lever on its pivot in a counterclockwise direction as viewed in Fig. 43. The lower end of the lever 271 engages a switch button 273 slidably supported in the member 258 and resiliently held against the lower end of the lever 271 by a spring 274. The button 273 constitutes the movable element of a switch which, when the button is in the normal position as shown in Fig. 43, establishes an electrical connection between terminal elements 275, 275 mounted in the member 258. These terminal elements are connected in a circuit 276 containing an electric motor 277, which constitutes the prime mover of the machine, as hereinafter described. A second set of terminal elements 270, 270 are connected in a separate circuit containing a signal lamp 278 mounted on the member 258, and the button 273 is adapted also to establish connection between the elements 270, 270 when the button is in the said normal position to thereby energize the lamp. The circuit 276 contains a manual switch 279. When as shown in Fig. 43 the terminal elements 275, 275 are electrically connected through the switch button 273, and assuming that the switch 279 is closed, the motor circuit 276 is completed, as also is the circuit containing the signal lamp 278. This is the condition of normal machine operation. When the plunger 244 has advanced to an extent bringing the fin 245 into engagement with the lever 271, the button 273 is shifted from the contacts 275, 275, with the result that the motor circuit is broken, thereby bringing the machine to a stop. Similarly the circuit containing the signal lamp 278 is broken, and the resulting extinguishment of the lamp 278 affords a visible signal indicating that the machine is no longer operating.

With reference to Figure 12, it will be noted that the collet 11 and its supporting sleeve 10 may be entirely removed from the frame 7 by releasing the holding screws 10a. When thus removed, the slide 3 may be advanced to an extent bringing the forward end of the work spindle into the position formerly held by the collet 11. The spindle itself will then function in lieu of the collet 11 to support the work adjacent to the tool position. Under these circumstances, the slide 3 will have the same stroke as in the previously described arrangement, and except for the fact that the path traversed by the slide will be further forward in the machine than previously, the operation will remain unchanged. One advantage of this arrangement is the fact that more of the bar stock may be consumed before it is necessary to insert a new bar, so that there is less waste in the operation of the machine.

When the working position of the slide 3 is changed in this manner, it is necessary also to correspondingly adjust the position of the member 258 which carries the automatic stop device described above. This is a further function of the adjusting screw 261. By adjusting the member 258 forwardly on the tube 236 to an extent corresponding to the forward adjustment of the path of movement of the slide 3, the stock pusher 244 will be permitted to advance to a corresponding extent before the fin 245 engages the switch-actuating lever 271, so that the operation of the machine will be interrupted when the forward end of the pusher rod 244 will have advanced through the spindle 2 to the maximum permissible extent.

Drive mechanism

Secured detachably to the main frame 9 of the machine at the rear end, see particularly Figs. 1 and 2, is a bracket 281 which constitutes a support for the major drive elements, the said bracket and the supported elements constituting a detachable unit of the machine assembly. At the top of the bracket 281 are bosses 282, 282 in which is supported a pin 283. This pin forms a pivotal support for an arm 284 and a bracket 285. The arm 284 is adjustably supported through the medium of an adjusting screw 286 which is threaded into the bracket 281 and which is locked in adjusted position by means of a lock nut 287. The bracket 285 is supported in turn by an adjusting screw 288, which is threaded in the arm 284 and is locked in adjusted position by a lock nut 289. The bracket 285 carries the electric motor 277, which as previously set forth constitutes the prime mover of the machine.

The motor shaft carries a pulley 291 which is connected through a belt 292 with a pulley 293 secured to a shaft 294 journaled in the outer end of the arm 284. The shaft 294 carries a second pulley 295, and this pulley is connected througn a belt 296 with a pulley 297 on a shaft 298 which is journaled in the bracket 281 and at 299 in the main frame 9. The motor shaft carries also a pulley 301 which is connected through a belt 302 with a pulley 303 on a shaft 304 journaled in the bracket 285, the function of this shaft being hereinafter described. It will be noted that the adjusting screws 286 and 288 afford a ready means for tensioning the belts 292 and 296 independently; and for adjusting the distances between the respective shafts for different sized pulleys with the same belts.

Secured to the shaft 298 is an elongated pulley 305, and this pulley is connected through a belt 306 with the pulley 131 of the spindle 2. The pulley 307 is supported at the upper end of a bell crank lever 308, which lever is pivotally supported at 309 on an extension 311 of the bracket 281. The other arm 312 of the lever 308 is resiliently supported by a spring 313 seating on the extension 311, this spring embracing a stud 314 which extends upwardly from the bracket extension 311 through an aperture in the arm 312 of the lever, and which has thereon a stop nut 315 which limits the upward movement of the arm 312 under the tension of the spring 313. The pulley 307 engages the belt 306, and functions in part to tension this belt upon the pulleys 305 and 131. The shaft of the pulley 307 carries a toothed pinion 316 which meshes with a gear 317 carried by a jack shaft 318 journaled in the upper end of the bell crank lever 308. This shaft carries a pulley 319 which is connected through a belt 321 with a pulley 322, this pulley being secured to a shaft 323 journaled in a casing 324 secured to the main frame 9 at the upper end of the machine, see Figures 25 and 26. The shaft 323 carries a worm 325 which meshes with a worm wheel 326 carried by a shaft 327 journaled in the casing 324, and this shaft 327 carries also a gear 328 which meshes with a gear 329 on a shaft 331 also journaled in the casing. The shaft 323 carries also a spiral gear 332, and this gear meshes with a spiral gear 333 on a shaft 334 journaled in the casing and paralleling the shaft 327. The shafts 334 and 327, see Figure 27, are uniformly spaced with respect to the shaft 331, so that the gear 328 may be shifted selectively between the shafts 327 and 334 for intermeshing engagement with the gear 329. Access to the casing for changing the gear 328 from one of the shafts 327 and 334 to the other is had through a cover-plate 335 which is secured to the outer end of the casing 324, as shown in Fig. 25. This interchangeability of the gear 328 on the shafts 327 and 334 provides for rapid change in the speed ratio between the shaft 323 and the shaft 331.

The arrangement described above also provides for an unusually wide range of speed change. Thus let it be assumed that the speed ratio between the shafts 327 and 334, by reason of the worm and spiral connections between these shafts respectively and the shaft 323, is, say, 6 to 1. Then with gears 328 and 329 of the same size and by the simple expedient of transferring the gear 328 from one of the shafts 327 and 334 to the other, the speed of the driven shaft 331 may be correspondingly modified. By providing a set of gears of different diameters interchangeable with the gears 328 and 329 to provide a driving connection of various speed ratios between either of the shafts 327 and 334 and the shaft 331, it would be possible to obtain a wide latitude of speed ratio between the last-named shaft and the shaft 323. If, for example, the speed ratio between the shaft 323 and the shafts 327 and 334 respectively is, say, 6 to 1 and, through the medium of a number of gears of differing diameters the possible speed ratio between each of the shafts 327 and 334 and the shaft 331, is, say, 6 to 1, then the speed ratio change between the shaft 323 and the shaft 331 would be 36 to 1.

The shaft 331 carries a gear 336. The gear 336 meshes with a gear 337 which is operatively connected, as hereinafter described, with a shaft 338, this latter shaft being journaled in the casing 324, as shown in Fig. 25. The shaft 338 carries a worm 339, and this worm meshes with a worm wheel 341 on the shaft 6. By the aforedescribed gear train, the belt 321, the pulley 307 and the belt 306, the shaft 6 is operatively connected with the shaft 298, and through this shaft and the belts 296 and 292 with the motor 277.

Means is provided for manually operating the shaft 6 independently of the motor. This manual operating means is illustrated in Fig. 25, wherein it will be noted that the gear 337 is carried by a sleeve 342 which is supported by and is axially adjustable on the shaft 338. The sleeve is connected to the shaft 338 through the medium of a pin 343, this pin being secured in the shaft and projecting through longitudinal slots 344 in the sleeve. The pin 343 also passes through an element 345 of a dog clutch, said element loosely embracing the sleeve 342 and being fixed to the shaft 338 through the medium of the pin. The sleeve 342 is free to slide longitudinally with respect to the element 345. Mounted on the outer end of the sleeve is a collar 346, this collar being free for angular movement with respect to the sleeve, but being held against relative axial movement on the sleeve by a shoulder 347 and a collar 348, the latter being detachably secured to the outer end of the sleeve. Fixed to the sleeve 346 is a crank handle 349. The sleeve 346 is formed for interlocking engagement with the element 345, and constitutes the other element of the dog clutch.

If it is desired to operate the shaft 338 manually, the sleeve 346 is moved inwardly into engagement with the clutch element 345, this inward movement shifting the sleeve 342 in the axial direction to an extent releasing the gear 337 from the gear 336. The shaft 338 may now be turned through the crank 349 entirely independently of the motor drive mechanism. Retraction of the sleeve 346 releases the sleeve from the clutch element 345 and returns the gear 337 into intermeshing engagement with the gear 336. A spring-pressed detent 351 is adapted to enter an annular groove 352 in the sleeve 342 to retain the sleeve in the position in which it is shown in Fig. 25, wherein the gear 337 meshes with the gear 336. A second circumferential groove 353 is adapted to be engaged by the button 351 when the sleeve is moved inwardly, as described above, for manual operation.

In setting up the machine, the shaft 6 is turned over by hand so as to bring that one of the tools which is to function as the cutting-off tool into position in front of the work-supporting collet 11, so that when the bar stock is passed through the spindle 2 and through the collet 11, the end of the stock will engage the said cutting-off tool. The slide 3 will now be in the advanced position and the collet 146 released from the stock. The stock is held against the cutting-off tool by the weight 253, which functions as previously described to exert pressure against the rear end of the bar stock, and to force it forwardly through the spindle. The stop 264 is now adjusted through the adjusting screw 261 so as to determine the extent of the stroke or reciprocatory movement of the slide 3, it being apparent that the extent to which the slide 3 in said movement is retracted from the most advanced position will establish the length of the bar stock which is presented to the cutting tools. The machine is now in condition for normal operation.

When the motor is started, the slide 3 is moved rearwardly to the extent permitted by the stop 264, the spindle during this movement sliding freely over the bar stock, which remains anchored against the cutting-off tool. After the rearward movement of the spindle-slide is completed, the sleeve 136 is actuated to cause the collet 146 to grip the stock, so that in the subsequent forward movement of the spindle-slide, the stock will be advanced through the work-supporting collet 11 into engagement with the tools, it being understood that prior to the beginning of the forward movement of the spindle, the cut-off tool will have been withdrawn from in front of the collet 11 so as to permit the stock to advance. The tools operate upon the stock to form the piece during the forward stroke of the spindle. After the cut-off tool in the final operation separates the formed piece from the stock bar, the aforedescribed cycle of operations is repeated.

I claim:

1. The combination with a relatively fixed tool support, of a rotary work spindle, means for axially traversing said spindle with respect to said support, a guide on said support, a member slidably supported in said guide for rectilinear movement toward and from the axial line of said spindle, a tool carrier pivotally mounted on said member on an axis paralleling the said spindle axis, and means for adjusting said carrier both angularly about and axially of said pivot.

2. The combination with a relatively fixed tool support, of a rotary work spindle, means for axially traversing said spindle with respect to said support, a guide on said support, a member slidably supported in said guide for rectilinear movement toward and from the axial line of said spindle, an adjusting screw rotatably mounted in said member, the axis of said screw paralleling the axis of said spindle, a tool carrier having threaded engagement with and pivotally supported on said screw, whereby said carrier may be adjusted both angularly about and axially of said screw, and means for clamping said carrier in adjusted position to said member.

3. The combination with a relatively fixed tool support, of a rotary work spindle, means for axially traversing said spindle with respect to said support, a guide on said support, a member slidably supported in said guide for rectilinear movement toward and from the axial line of said spindle, an adjusting screw rotatably mounted in said member, the axis of said screw paralleling the axis of said spindle, a tool carrier having threaded engagement with and pivotally supported on said screw, said screw thereby constituting a means for adjusting said carrier axially of the spindle and angularly with respect to the spindle axis, and means for clamping said carrier in adjusted position to said member.

4. The combination with a relatively fixed tool support, of a rotary work spindle, means for axially traversing said spindle with respect to said support, a guide on said support, a member slidably supported in said guide for rectilinear movement toward and from the axial line of said spindle, an adjusting screw rotatably mounted in said member, the axis of said screw paralleling the axis of said spindle, a tool carrier having threaded engagement with and pivotally supported on said screw, said screw thereby constituting a means for adjusting said carrier axially of the spindle, means for adjusting the carrier angularly about the screw axis, and means for clamping said carrier in adjusted position to the said member and against said screw.

5. The combination with a relatively fixed tool support, of a rotary work spindle, means for axially traversing said spindle with respect to said support, a guide on said support, a member slidably supported in said guide for rectilinear movement toward and from the axial line of said spindle, an adjusting screw rotatably mounted in said member, the axis of said screw paralleling the axis of said spindle, a tool carrier having threaded engagement with and pivotally supported on said screw, said screw thereby constituting a means for adjusting the carrier longitudinally of the spindle axis, threaded means interengaged with said carrier and with said member for determining the angular position of the carrier about the screw axis, and means for clamping said carrier in adjusted position to said member.

6. The combination with a relatively fixed tool support, of a rotary work spindle, means for axially traversing said spindle with respect to said support, a guide on said support, a member slidably supported in said guide for rectilinear movement toward and from the axial line of said spindle, an adjusting screw rotatably mounted in said member, the axis of said screw paralleling the axis of said spindle, a tool carrier having threaded engagement with and pivotally supported on said screw, said screw thereby constituting a means for adjusting the carrier longitudinally of the spindle axis, threaded means interengaged with said carrier and with said member for determining the angular position of the carrier about the screw axis, and means for clamping said carrier in adjusted position to said member, said clamping means comprising a bolt on said carrier, a slotted way in said member paralleling the axis of said screw, and a nut slidably retained in said way and engaged with the threaded extremity of said bolt.

7. The combination with a relatively fixed tool support, of a rotary work spindle, means for axially traversing said spindle with respect to said support, a guide on said support, a member slidably supported in said guide for rectilinear movement toward and from the axial line of said spindle, resilient means confined between said guide and said member and exerting pressure to retract said member from said axial line, a tool carrier mounted on said member for adjustments both longitudinally and transversely of said line, means for clamping said carrier in adjusted position to said member, and actuating means engaging said carrier for urging said carrier and member toward said line against the pressure of said resilient means.

8. The combination with a relatively fixed tool support, of a rotary work spindle, means for axially traversing said spindle with respect to said support, a guide on said support, a member slidably supported in said guide for rectilinear movement toward and from the axial line of said spindle, resilient means confined between said guide and said member and exerting pressure to retract said member from said axial line, a tool carrier mounted on said member for adjustments both longitudinally and transversely of said line, means for clamping said carrier in adjusted position to said member, and actuating means engaging said carrier for urging said carrier and member toward said line against the pressure of said resilient means, said actuating means comprising a longitudinally slotted pivoted lever engaging said carrier, a shackle element mounted and adjustable in said slot longitudinally of the lever, and power-driven means pivotally connected to said shackle.

9. The combination with a relatively fixed tool support, of a rotary work spindle, means for axially traversing said spindle with respect to said support, a guide on said support, a member slidably supported in said guide for rectilinear movement toward and from the axial line of said spindle, resilient means confined between said guide and said member and exerting pressure to retract said member from said axial line, a tool carrier mounted on said member for adjustments both longitudinally and transversely of said line, means for clamping said carrier in adjusted position to said member, and actuating means engaging said carrier for urging said carrier and member toward said line against the pressure of said resilient means, said actuating means comprising a pivoted lever engaged with said carrier and having a longitudinal slot, a shackle element secured and adjustable in said slot longitudinally of said lever, a second lever, a link pivotally connecting said second lever with said shackle element, and power means operatively connected to said second lever.

10. The combination with a relatively fixed tool support, of a rotary work spindle, means for axially traversing said spindle with respect to said support, a guide on said support, a member slidably supported in said guide for rectilinear movement toward and from the axial line of said spindle, resilient means confined between said guide and said member and exerting pressure to retract said member from said axial line, a tool carrier mounted on said member for adjustments both longitudinally and transversely of said line, means for clamping said carrier in adjusted position to said member, and actuating means engaging said carrier for urging said carrier and member toward said line against the pressure of said resilient means, said actuating means comprising a pivoted lever, and transmission elements connected to said lever and operative under tension to actuate the latter.

11. The combination with a relatively fixed tool support, of a rotary work spindle, means for axially traversing said spindle with respect to said support, a guide on said support, a member slidably supported in said guide for rectilinear movement toward and from the axial line of said spindle, resilient means confined between said guide and said member and exerting pressure to retract said member from said line, a tool carrier mounted on said member for adjustments both longitudinally and transversely of said line, means for clamping said carrier in adjusted position to said member, and actuating means engaging said carrier for urging said carrier and member toward said line against the pressure of said resilient means, said actuating means comprising a pivoted lever engaged with said carrier, a cam, a cam lever, and transmission elements connecting the cam lever with the lever first named and operative under tension to actuate the latter.

12. The combination with a relatively fixed tool support, of a rotary work spindle axially traversible with respect to said support, a guide mounted on said support for pivotal movement about an axis paralleling the axis of said spindle, a member longitudinally adjustable on said guide, a tool carrier pivotally mounted on said member on an axis paralleling the axis of said spindle for angular adjustment in a plane normal to said axes, means for adjusting said carrier longitudinally of said pivotal axis, means for clamping said carrier in adjusted position on said member, and means for oscillating said pivotally mounted guide.

13. The combination with a relatively fixed tool support, of a rotary work spindle axially traversible with respect to said support, a guide pivotally mounted on said support for oscillation about an axis paralleling the axis of said spindle, a member mounted at each end of said guide for adjustment longitudinally of the latter, a tool carrier adjustably mounted on each of said members, resilient means interposed between the guide and each of said members and exerting pressure on the latter to force the members outwardly on said guide and away from the pivotal axis of the latter, a pair of adjustable stops mounted at one end of said guide, one of said stops engaging the proximate member and limiting the outward movement of said member on the guide under action of the associated resilient means, a lever at the opposite end of said guide for engagement with the other of said members, a rod mounted in and extending longitudinally of said guide and having one end in engagement with said lever, the other end of said rod being engaged by the second of said adjustable stop elements whereby said latter stop element through said rod and lever may operate to limit the outward movement of said last-named member on the guide, and means for oscillating said guide about its pivot.

NICHOLAS P. LLOYD.